US012318261B2

(12) United States Patent
May et al.

(10) Patent No.: US 12,318,261 B2
(45) Date of Patent: Jun. 3, 2025

(54) DENTAL FLOSSING PICK

(71) Applicant: QUIP NYC INC., Brooklyn, NY (US)

(72) Inventors: William Thomas May, South Orange, NJ (US); Simon Enever, Brooklyn, NY (US); Paul Koh, New York, NY (US); Maxwell Wood-Lee, Brooklyn, NY (US); Jonathan Fratti, Brooklyn, NY (US)

(73) Assignee: Quip NYC Inc., Brooklyn, NY (US)

( * ) Notice: Subject to any disclaimer, the term of this patent is extended or adjusted under 35 U.S.C. 154(b) by 11 days.

(21) Appl. No.: 18/112,108

(22) Filed: Feb. 21, 2023

(65) Prior Publication Data

US 2023/0190428 A1 Jun. 22, 2023

Related U.S. Application Data

(63) Continuation of application No. 17/474,801, filed on Sep. 14, 2021, now Pat. No. 11,612,465.
(Continued)

(51) Int. Cl.
*A61C 15/04* (2006.01)
(52) U.S. Cl.
CPC .......... *A61C 15/046* (2013.01); *A61C 15/043* (2013.01)
(58) Field of Classification Search
CPC ....... A61C 15/00; A61C 15/04; A61C 15/041; A61C 15/042; A61C 15/043;
(Continued)

(56) References Cited

U.S. PATENT DOCUMENTS 4,660,584 A * 4/1987 Wofford .............. A61C 15/046
132/325
6,047,712 A * 4/2000 Blades ................ A61C 15/043
132/324
(Continued)

FOREIGN PATENT DOCUMENTS

CH 695439 A5 5/2006
JP 2001087286 A 4/2001

OTHER PUBLICATIONS

The International Bureau of WIPO, "Notification Concerning Transmittal of International Preliminary Report on Patentability," issued in related International Patent Application No. PCT/US2021/050291 mailed Mar. 23, 2023 (9 pages).
(Continued)

*Primary Examiner* — Rachel R Steitz
*Assistant Examiner* — Karim Asqiriba
(74) *Attorney, Agent, or Firm* — ArentFox Schiff LLP

(57) ABSTRACT

A dental flossing pick includes a body, a lever, and at least one torsion spring. The body may include a first arm and a first jaw, and the lever may include a second arm and a second jaw. The lever may be rotatably coupled to the body, and the at least one torsion spring may be coupled to the body and the lever. The first arm and the second arm may be rotatable toward one another, against a resistance force of the at least one torsion spring, from an open state to a closed state to form a handle. In the closed state, the first jaw and the second jaw may be clamped to one another to form a fork distal to the handle. The fork may include a first prong and a second prong defining therebetween a gap in which a length of dental floss material may be secured.

7 Claims, 22 Drawing Sheets

Related U.S. Application Data

(60) Provisional application No. 63/078,172, filed on Sep. 14, 2020.

(58) Field of Classification Search
CPC ... A61C 15/045; A61C 15/046; A61C 15/047; A61C 15/048; A46B 15/0069; A46B 15/0071; A46B 15/0073; A46B 2200/108
See application file for complete search history.

(56) References Cited

U.S. PATENT DOCUMENTS

| | | | | |
|---|---|---|---|---|
| 6,571,804 | B2 * | 6/2003 | Adler | A61C 15/043 |
| | | | | 132/328 |
| 6,997,191 | B2 * | 2/2006 | Nudo, Sr. | A61C 15/046 |
| | | | | 132/328 |
| 7,270,129 | B1 * | 9/2007 | Rehkemper | A61C 17/3481 |
| | | | | 132/322 |
| 8,800,573 | B2 * | 8/2014 | Hofstad | A46B 15/0079 |
| | | | | 132/289 |
| 10,034,729 | B2 * | 7/2018 | Kozak | A61C 15/043 |
| 2002/0020427 | A1 * | 2/2002 | Lin | A61C 15/046 |
| | | | | 132/321 |
| 2003/0029472 | A1 * | 2/2003 | Adler | A61C 15/046 |
| | | | | 132/324 |
| 2003/0140939 | A1 * | 7/2003 | Nudo, Sr. | A61C 15/046 |
| | | | | 132/325 |
| 2008/0041413 | A1 * | 2/2008 | Jih | A61C 15/046 |
| | | | | 132/322 |
| 2009/0301514 | A1 * | 12/2009 | Passafaro | A61C 15/046 |
| | | | | 132/326 |
| 2010/0006120 | A1 * | 1/2010 | Shen | A61C 15/046 |
| | | | | 132/325 |
| 2016/0361147 | A1 * | 12/2016 | Chodorow | A61C 15/046 |
| 2018/0140397 | A1 * | 5/2018 | Kozak | A61C 15/045 |
| 2018/0353274 | A1 * | 12/2018 | Horowitz | A61C 19/063 |
| 2022/0079726 | A1 * | 3/2022 | White | A46B 15/0071 |
| 2024/0050208 | A1 * | 2/2024 | Bouthot | A61C 15/046 |

OTHER PUBLICATIONS https://www.paro.com.pl/en/nici-i-uchwyty; PARO+ Flosses and holders; 6 pages, accessed Jul. 19, 2021.
https://paro.com/en/produkte-uebersicht-2/#1765-paro-floss-holder-en; 2 pages; accessed on Jul. 19, 2021.
PCT; International Searching Authority; International Application No. PCT/US2021/050291; Search Report and Written Opinion mailed Jan. 5, 2022; 15 pages.
Office Action for U.S. Appl. No. 17/474,801, mailed Oct. 24, 2022.

* cited by examiner

DENTAL FLOSSING PICK

CROSS-REFERENCE TO RELATED APPLICATIONS

This application is a continuation of U.S. patent application Ser. No. 17/474,801, filed on Sep. 14, 2021, which claims the benefit of priority of U.S. Provisional Patent Application No. 63/078,172, filed on Sep. 14, 2020, with the entire contents of each of these applications incorporated herein by reference.

BACKGROUND

To maintain good oral health, it is recommended that teeth are not only brushed but also flossed using dental floss. Dental floss material typically comes in a string form and is generally dispensed from a bobbin contained within a dispenser housing. A cutting device is used to cut a desired length of the string of the dental floss material. A user can then use the cut length of floss string to insert it between the teeth for flossing. However, manually holding dental floss material taut during flossing can be difficult for some users, such as users with teeth spaces that are difficult to reach.

Other variations of dental floss appliances include pre-fabricated picks having a short piece of dental floss material spanning across two supports. These picks generally come in packs and are single use items. That is, once used, the entire pick and used dental floss material are discarded.

There is a need to provide a more efficient and effective way of holding and using of dental floss material to floss teeth.

SUMMARY

According to one aspect, a dental flossing pick may include a body including a first arm and a first jaw, a lever including a second arm and a second jaw, the lever rotatably coupled to the body, and at least one torsion spring coupled to the body and the lever, the first arm and the second arm rotatable toward one another, against a resistance force of the at least one torsion spring, from an open state to a closed state to form a handle, and, in the closed state, the first jaw and the second jaw clamped to one another, collectively forming a fork distal to the handle, and, the fork including a first prong and a second prong defining therebetween a gap along which a length of dental floss material supportable in tension.

In some implementations, the first arm of the body may define a longitudinal axis, and the lever may be rotatable relative to the body about a rotational axis skew to the longitudinal axis.

In certain implementations, the first arm of the body may extend proximal to the second arm of the lever when the body and the lever collectively forming the handle.

In some implementations, the first arm of the body may define a recess, and the second arm of the lever is releasably securable in the recess in the closed state in which the first arm of the body and the second arm of the lever form the handle. For example, releasable securement of the second arm of the lever in the recess of the body may resist rotation of the lever and the body relative to one another under force of the at least one torsion spring. As an example, the dental flossing pick may further include a locking mechanism carried along the body, wherein the locking mechanism includes a linear spring and a pin, the linear spring and the pin are supported along the first arm of the body, the linear spring biases the pin into the recess defined by the first arm of the body, and the second arm of the lever defines at least one notch releasably engageable with the pin in the recess. Further, or instead, the first arm of the body may include an actuator in mechanical communication with the pin, and the actuator may be depressible to retract the pin, against the bias of the linear spring, from the at least one notch of the second arm of the lever to release resistance to rotational movement between the lever and the body such that the first arm and the second arm move from the closed state to the open state in which the first jaw and the second jaw are unclamped from one another. As an example, the actuator may be along a portion of the first arm proximal to the second arm of the lever such that the lever is rotatable away from the actuator in response to depression of the actuator.

In certain implementations, the first jaw and the second jaw may include respective traction features interlocking one another with the first jaw and the second jaw clamped to one another in the closed state.

According to another aspect, a dental hygiene system may include a dental flossing pick including a handle and a fork coupled to one another, the fork including a first prong and a second prong, and the fork actuatable to clamp a length of dental floss material in tension in a gap defined by the first prong and the second prong, and a case including a base, a panel, and a dispenser, the panel releasably securable to the base, the panel having a first surface supporting the dispenser, the dispenser including a wall extending away from the first surface, the base defining a cavity extending in a direction opposite the wall of the dispenser, and the dental flossing pick storable along the base with the fork in the cavity and the handle supported on the wall of the dispenser.

In some implementations, the wall of the dispenser defines a dispensing volume, and the handle of the dental flossing pick is supportable on the wall of the dispenser to cover the dispensing volume. The dispenser may, for example, further include a cutting element. The wall may define a slit, and the cutting element may be supported on the wall adjacent to the slit. As an example, the base may define a compartment, and the panel is releasably securable to the base over the compartment. The panel may include, for example, a button section along the first surface, the button section is disposed between the cavity and the dispenser, and the button section is depressible to release the panel from the base to expose the compartment. Further, or instead, the panel may have a second surface opposite the first surface, the panel is releasably securable over the compartment with the second surface facing the compartment, and the panel and the wall of the dispenser collectively define an orifice extending from the second surface of the panel to the dispensing volume. A linear distance between the orifice and the cutting element may be greater than a distance between the first prong and the second prong of the flossing pick. The dental hygiene system may further include a cartridge including a container, a bobbin of dental floss material, and a lid, wherein the container includes a rim, the lid is disposed on the rim of the container such that the container and the lid collectively envelop the bobbin of dental floss material, the container defines a hole away from the lid, an end of the bobbin of dental floss material extends through the hole, and the cartridge is positionable in the compartment defined by the base, and the end of the bobbin of dental floss material is extendible from the compartment to the dispensing volume via the orifice. The cartridge may further include a covering adhered to the bobbin of dental floss material and extending circumferentially about the bobbin of dental floss material.

In certain implementations, a portion of the wall closest to the cavity includes a lip having a shape conforming to a contour of the handle of the dental flossing pick.

In some implementations, the case may further include a cover positionable over the flossing pick stored on the base.

BRIEF DESCRIPTION OF DRAWINGS

FIG. 2I is a front perspective view of the dental flossing pick of FIG. 1A, shown with the bar exploded.

DETAILED DESCRIPTION

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to elaborate upon the embodiments and does not pose a limitation on the scope of those embodiments. No language in the specification should be construed as indicating any unclaimed element as essential to the practice of the disclosed embodiments.

As used herein, the terms "distal" and "proximal" shall be understood to refer to relative orientation of components of a dental flossing pick with reference to an end user (e.g., a person) whose teeth are flossed using the dental flossing pick. Specifically, unless otherwise specified or made clear from the context, a component that is distal to another component shall be understood to be closer to the teeth of the end user when the dental flossing pick is used in a flossing procedure. Further, unless otherwise specified or made clear from the context, a component that is proximal to another component shall be understood to be farther away from the teeth of the end user when the dental flossing pick is used in a flossing procedure. Thus, as a specific example, a handle of a dental flossing pick shall be understood to be proximal to a fork of the given dental flossing pick. As a corollary, a fork of a dental flossing pick shall be understood to be distal to the handle of the given dental flossing pick.

Figure 1A:
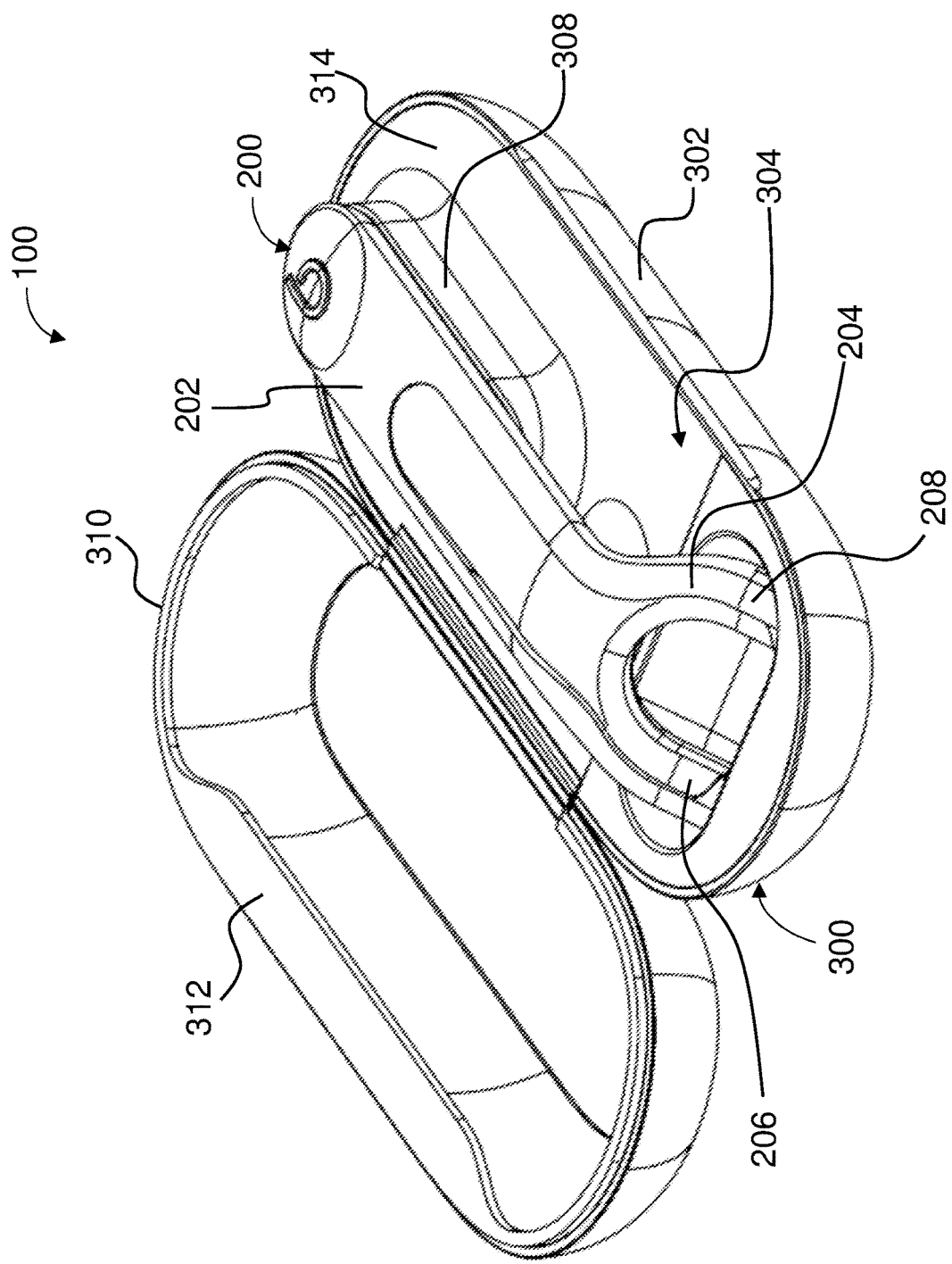
FIG. 1A is a perspective view of a dental hygiene system including a dental flossing pick and a case, the dental flossing pick shown positioned in the case and the case is shown in an open position.
Figure 1B:
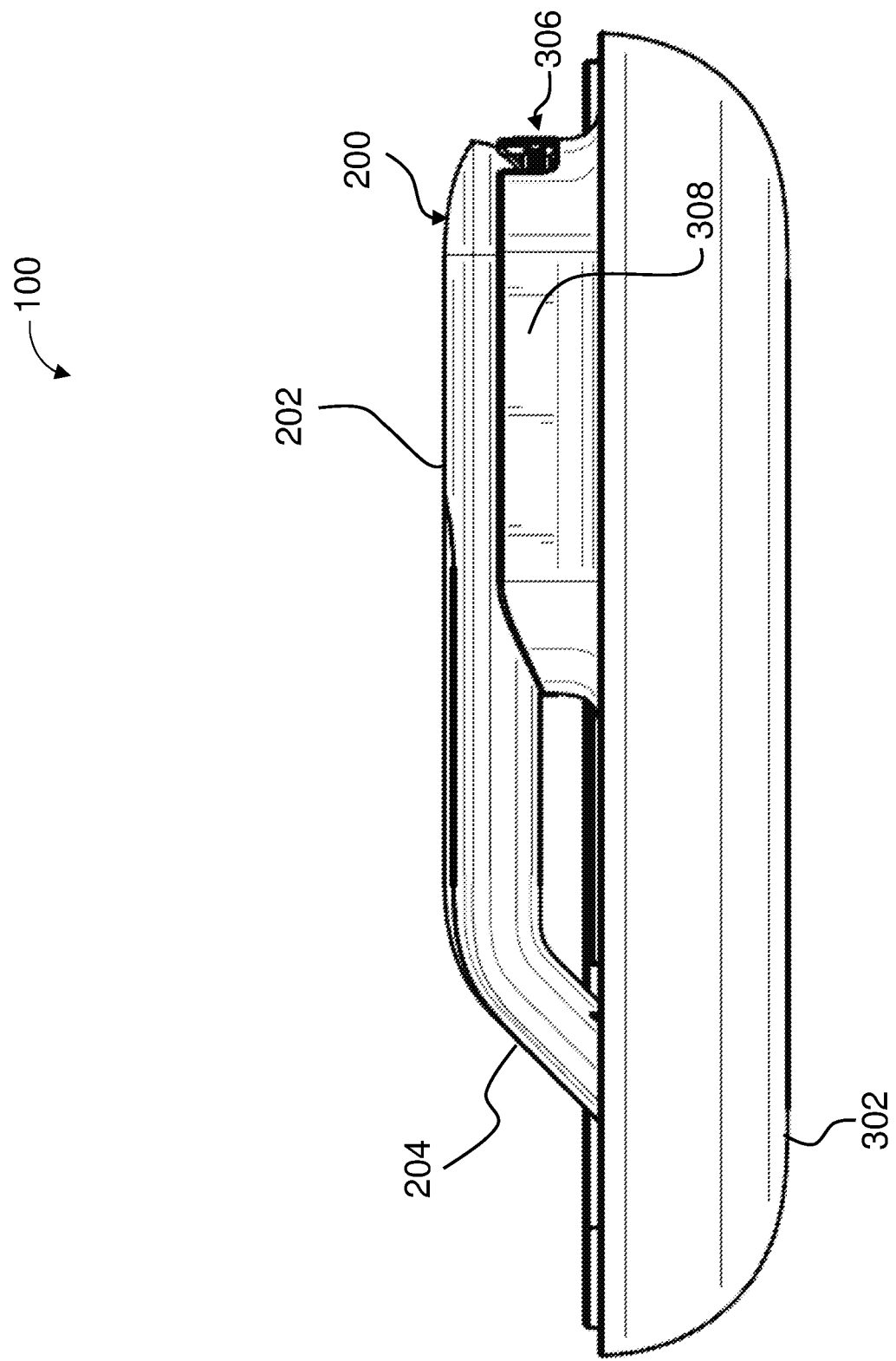
FIG. 1B is a side view of the dental hygiene system of FIG. 1A.
Figure 1C:
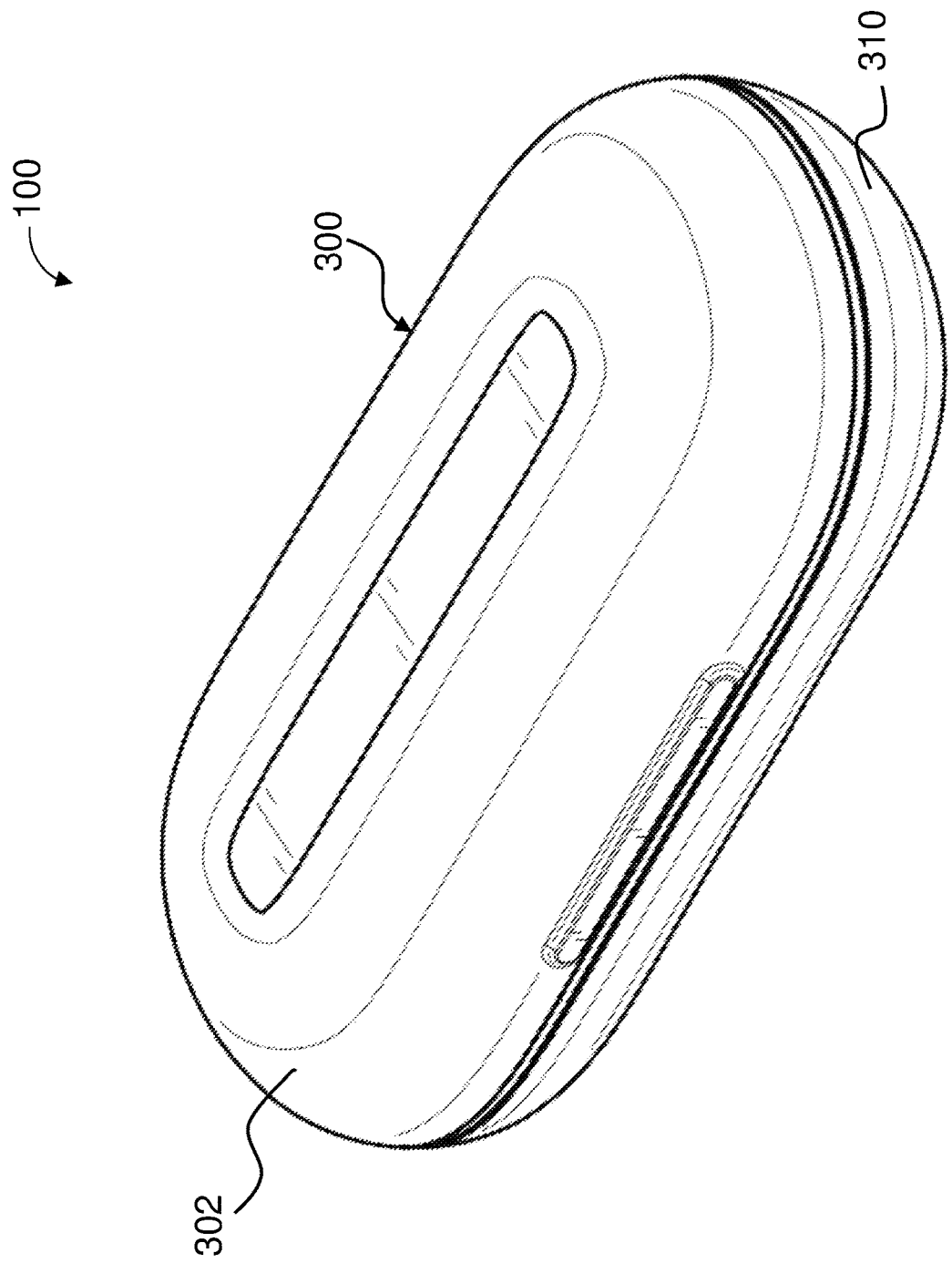
FIG. 1C is a perspective view of the dental hygiene system of FIG. 1A, shown with the case in a closed position about the dental flossing pick.
Figure 2A:
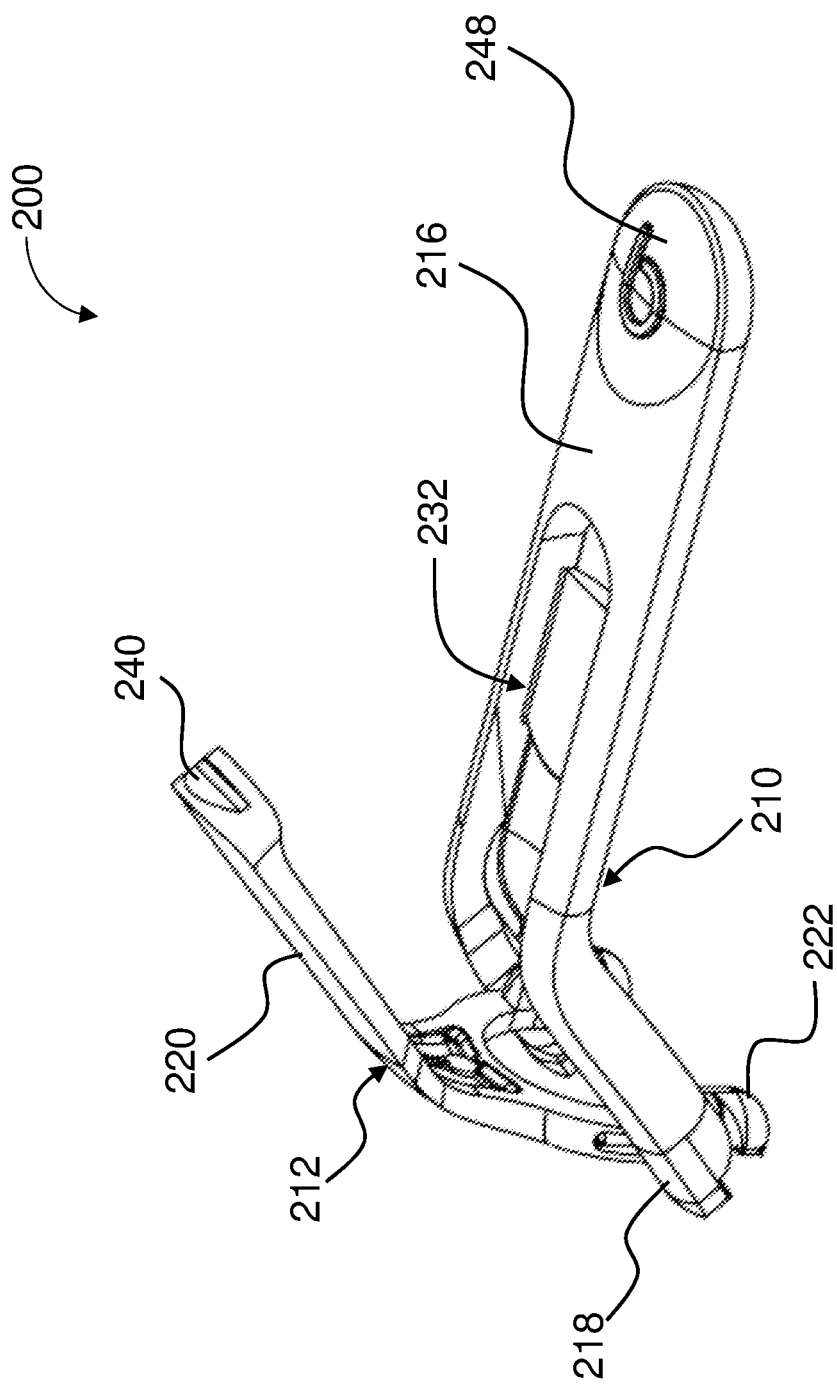
FIG. 2A is a top perspective view of the dental flossing pick of FIG. 1A, with the dental flossing pick shown in an open state.
Figure 2B:
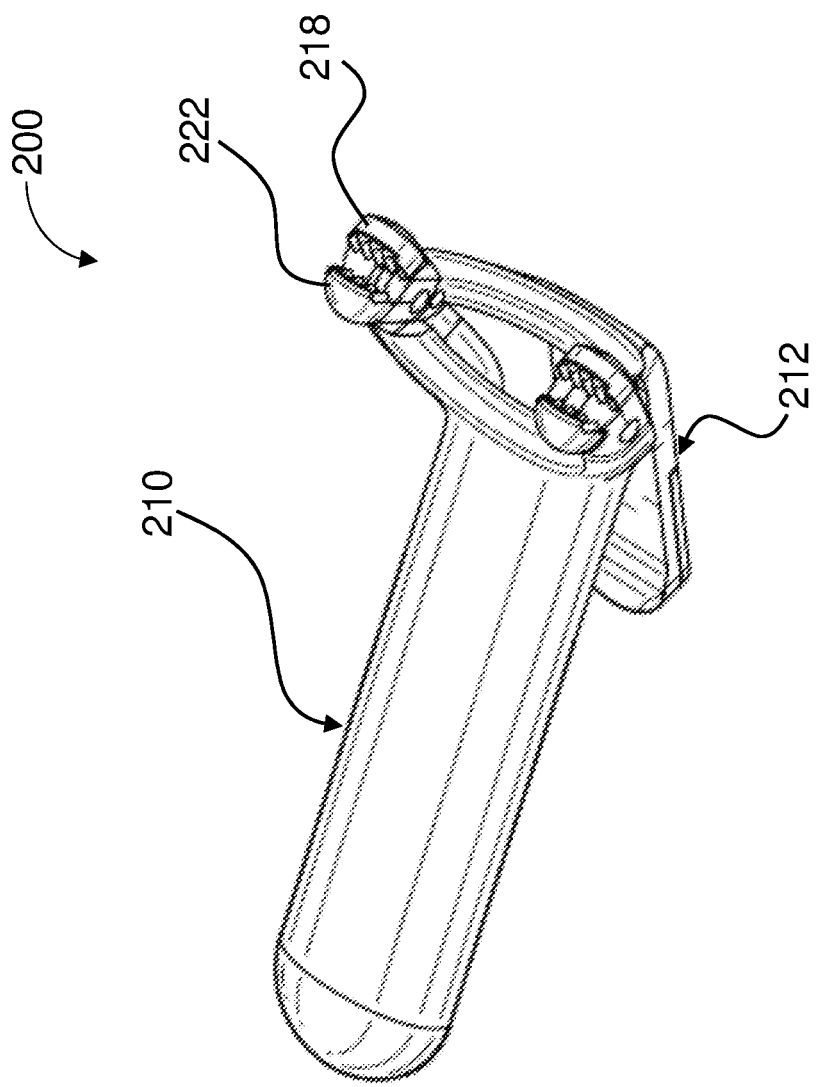
FIG. 2B is a bottom perspective view of the dental flossing pick of FIG. 1A, with the dental flossing pick shown in the open state.
Figure 2C:
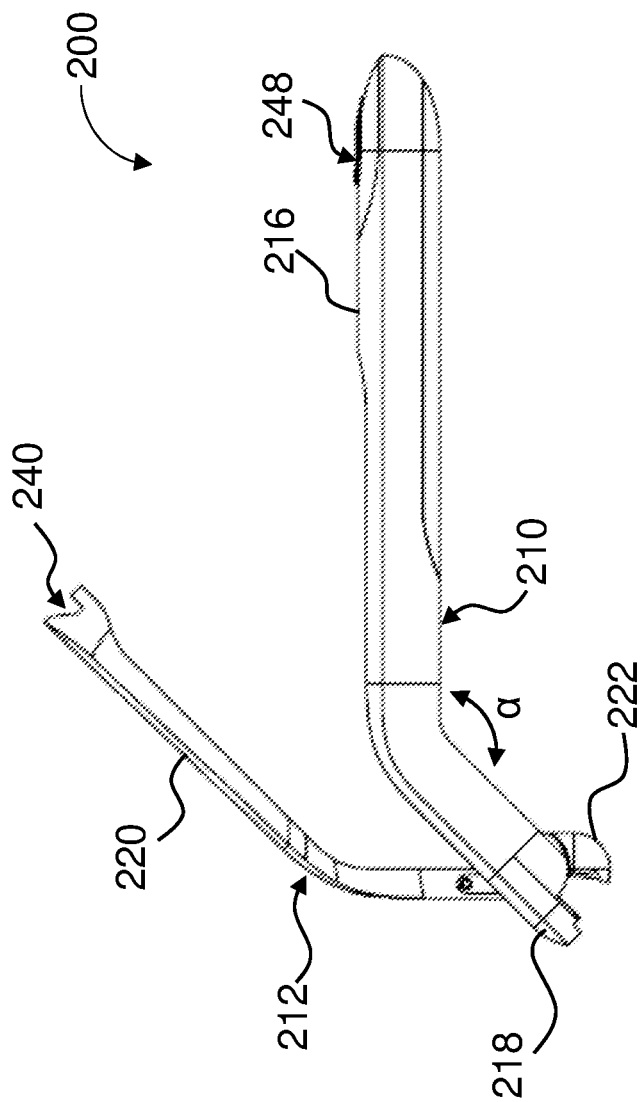
FIG. 2C is a side view of the dental flossing pick of FIG. 1A, with the dental flossing pick shown in the open state.
Figure 2D:
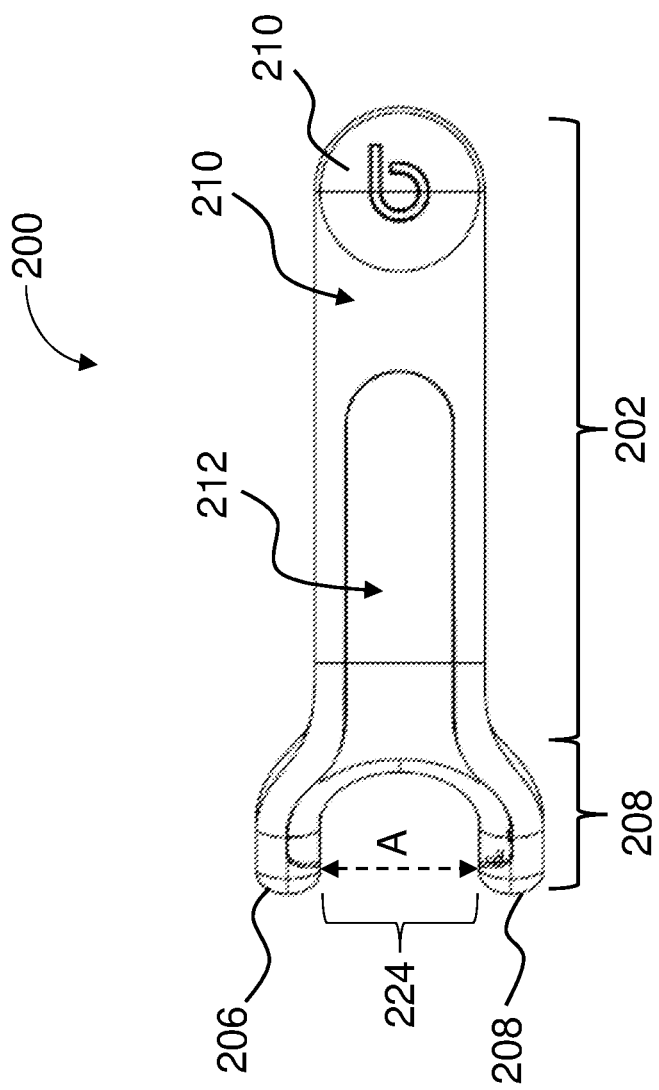
FIG. 2D is a top view of the dental flossing pick of FIG. 1A, with the dental flossing pick shown in the closed state.
Figure 2E:
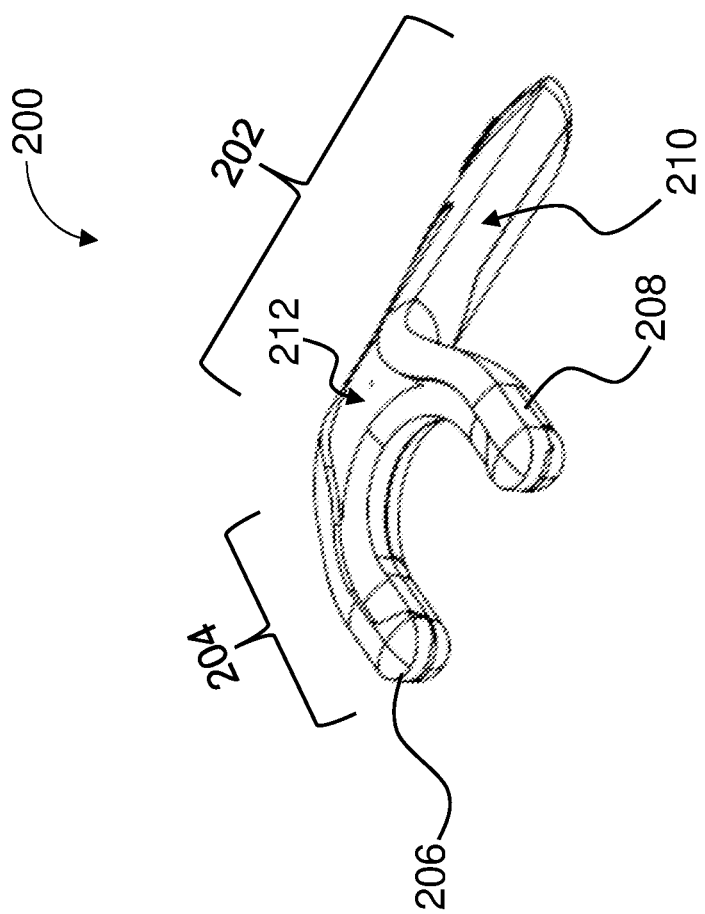
FIG. 2E is a front perspective view of the dental flossing pick of FIG. 1A, with the dental flossing pick shown in the closed state.
Figure 2F:
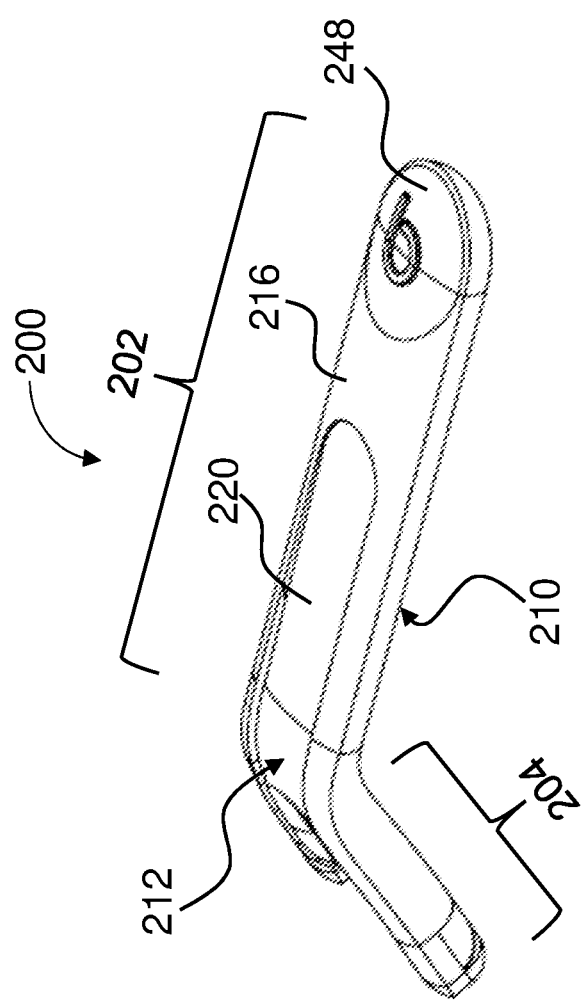
FIG. 2F is a rear perspective view of the dental flossing pick of FIG. 1A, with the dental flossing pick shown in the closed state.
Figure 2G:
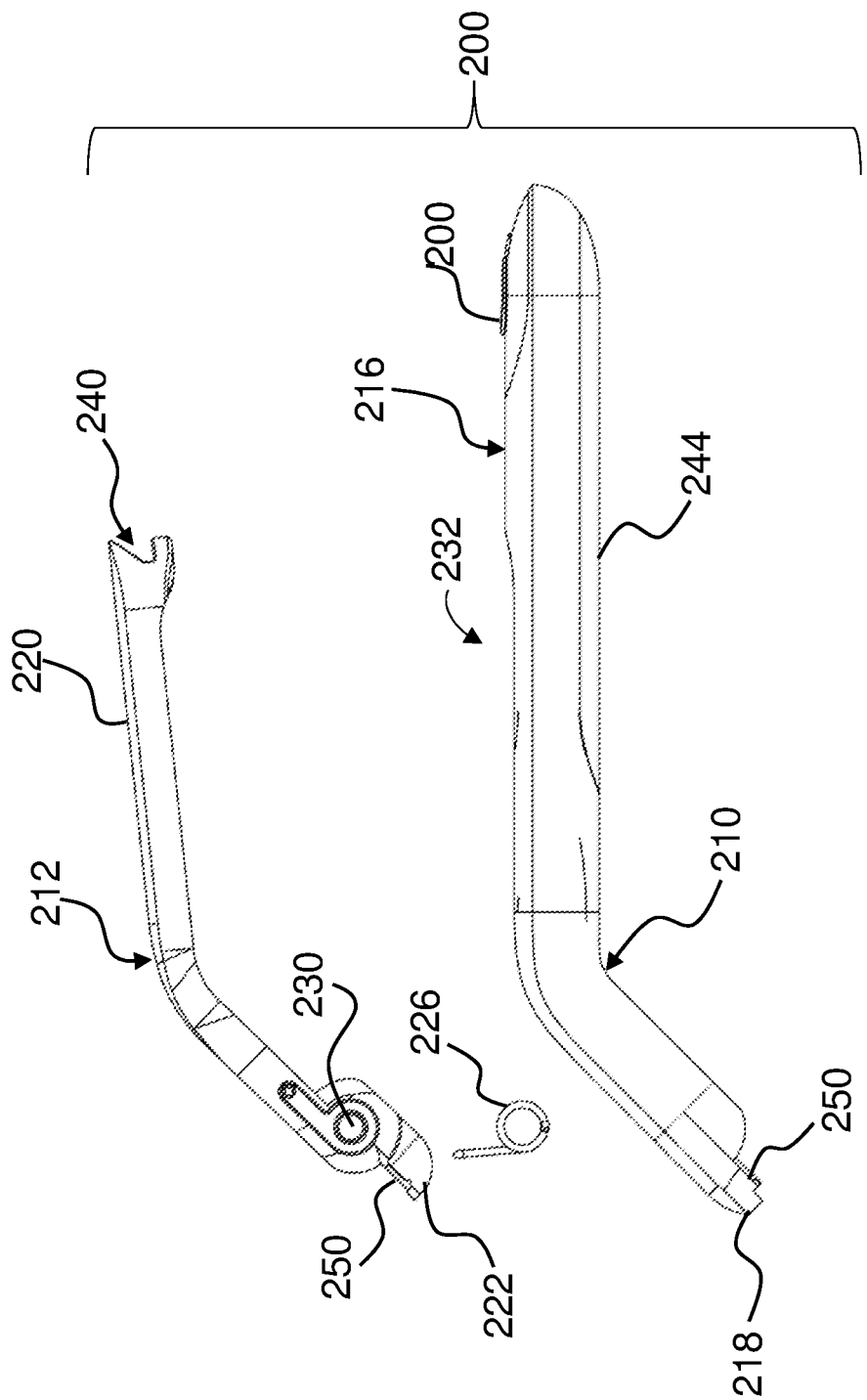
FIG. 2G is a side view of the dental flossing pick of FIG. 1A, shown with a bar, a lever, and a spring exploded relative to one another.
Figure 2H:
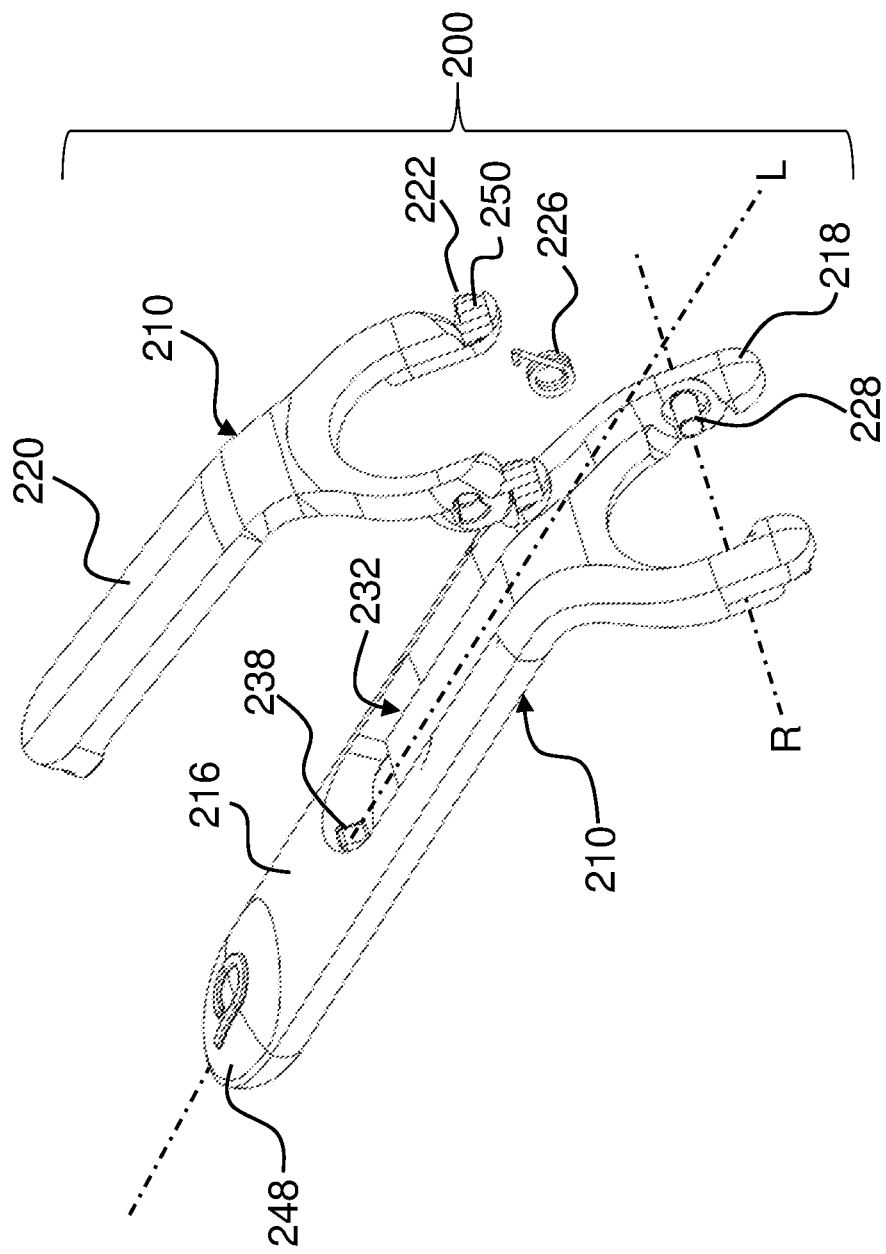
FIG. 2H is a front perspective view of the exploded representation of the dental flossing pick shown in FIG. 2G.
Figure 21:
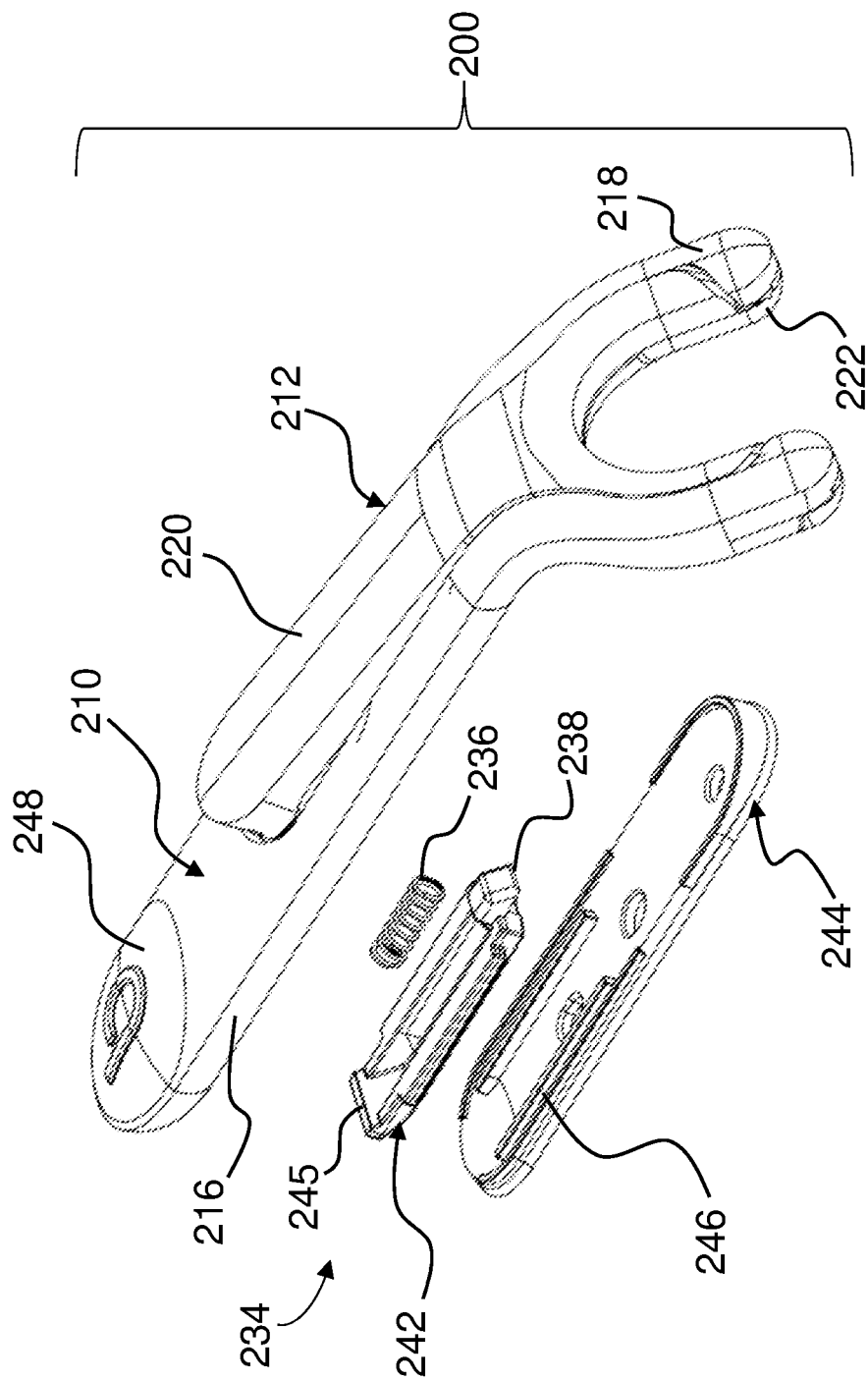
Figure 2J:
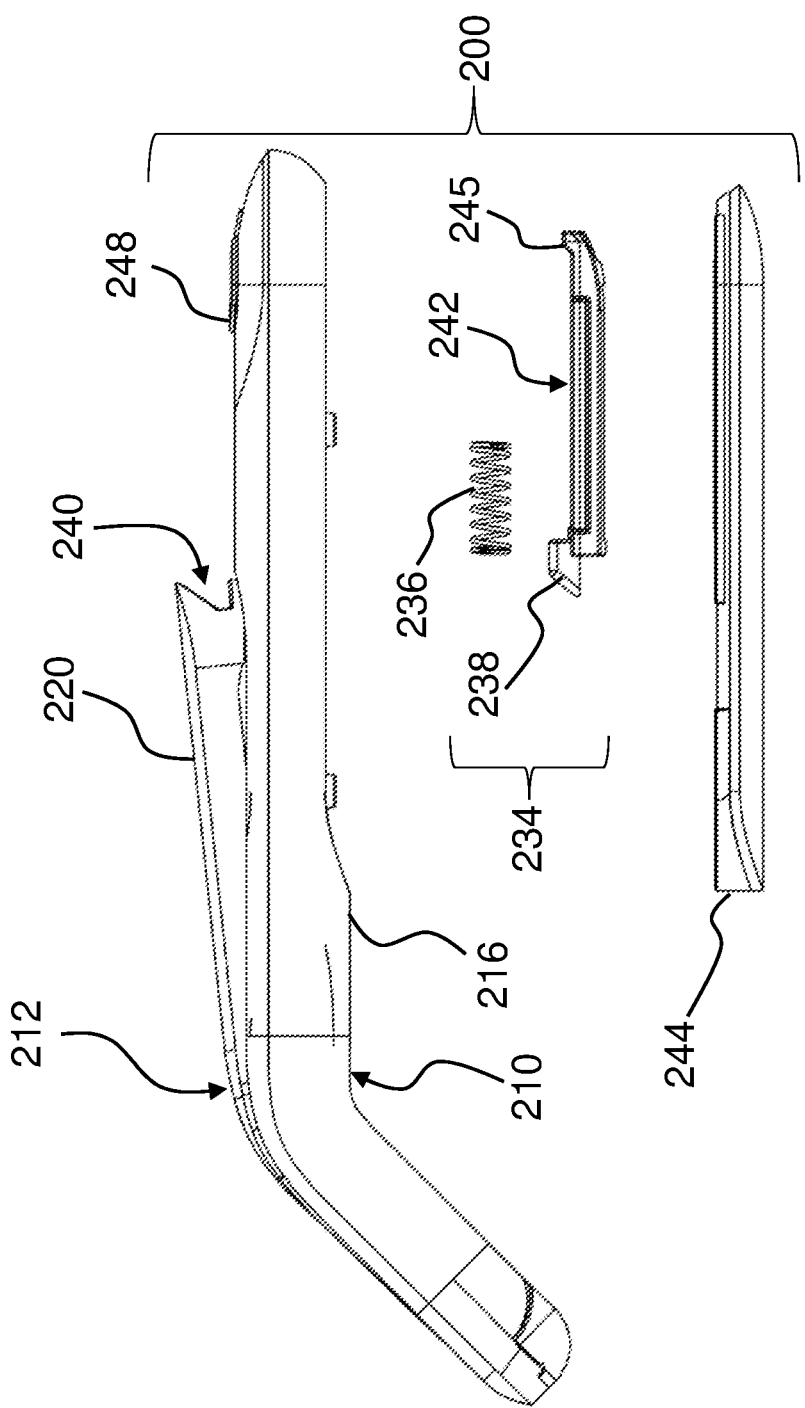
FIG. 2J is a side view of the exploded representation of the dental flossing pick shown in FIG. 2I.
Figure 3A:
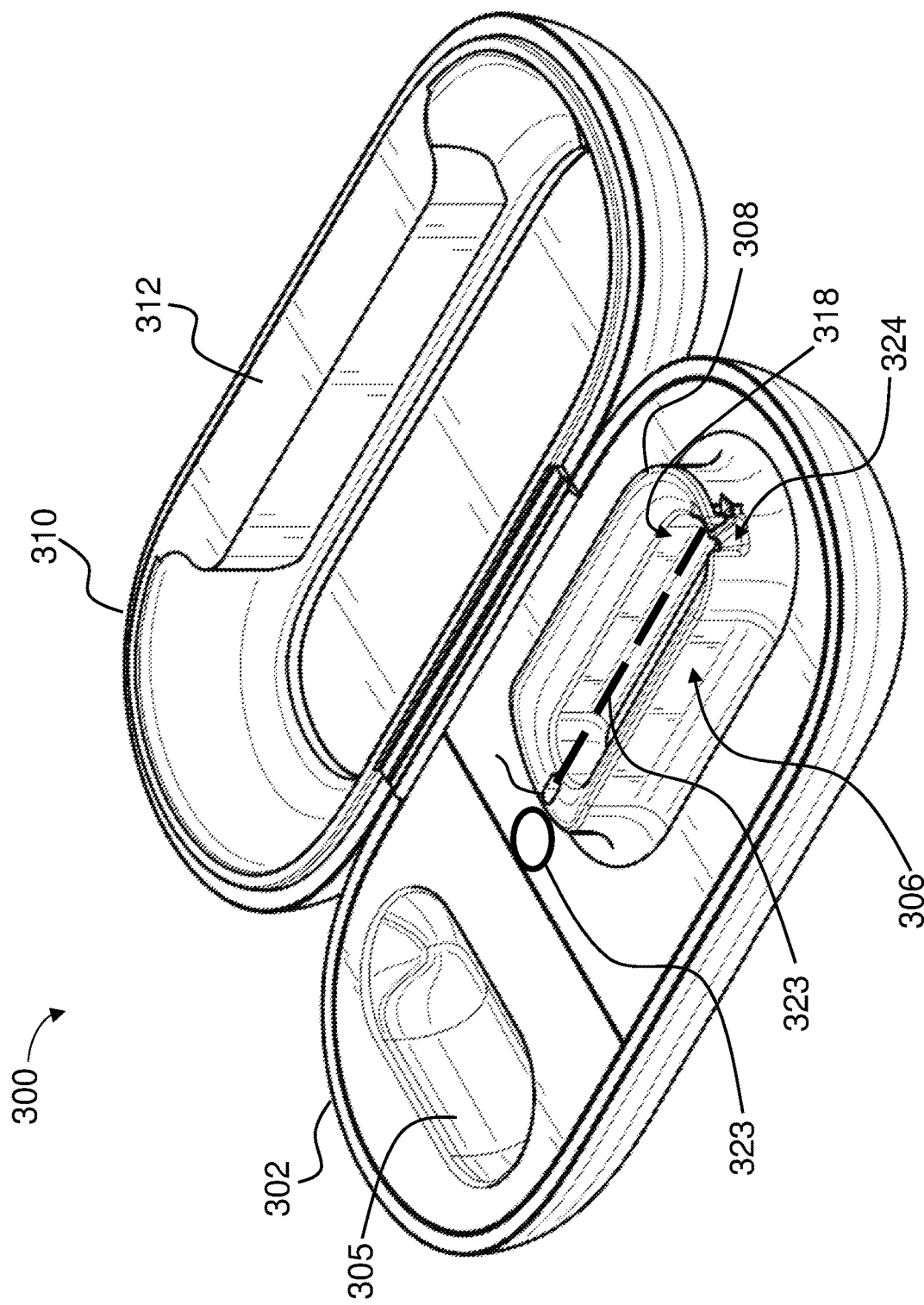
FIG. 3A is a front perspective view of the case of FIG. 1A, with the case shown in the open position and a dispenser of the case shown with a dental floss material extending across a dispensing volume.
Figure 3B:
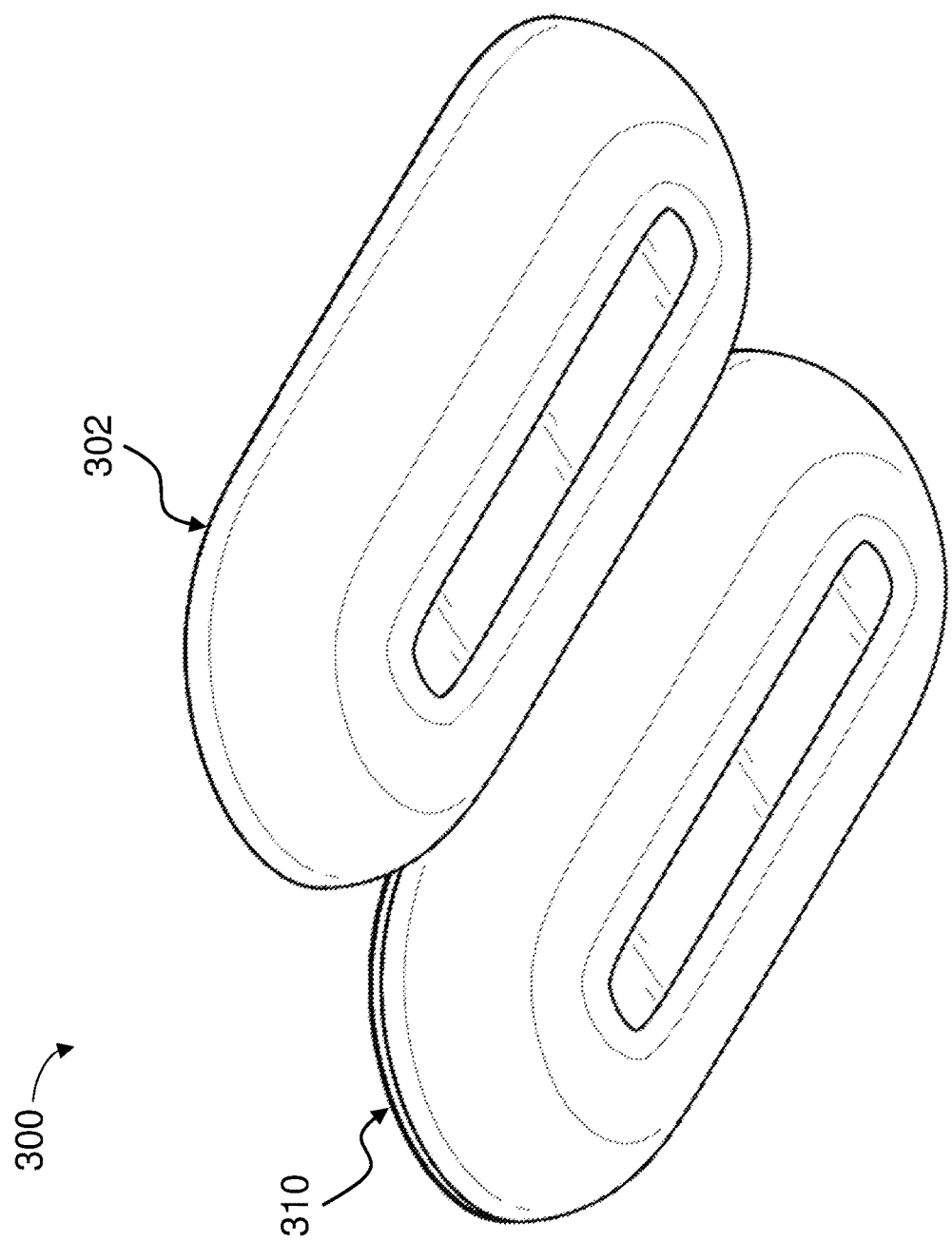
FIG. 3B is a rear perspective view of the case of FIG. 1A, with the case shown in the open position.
Figure 3C:
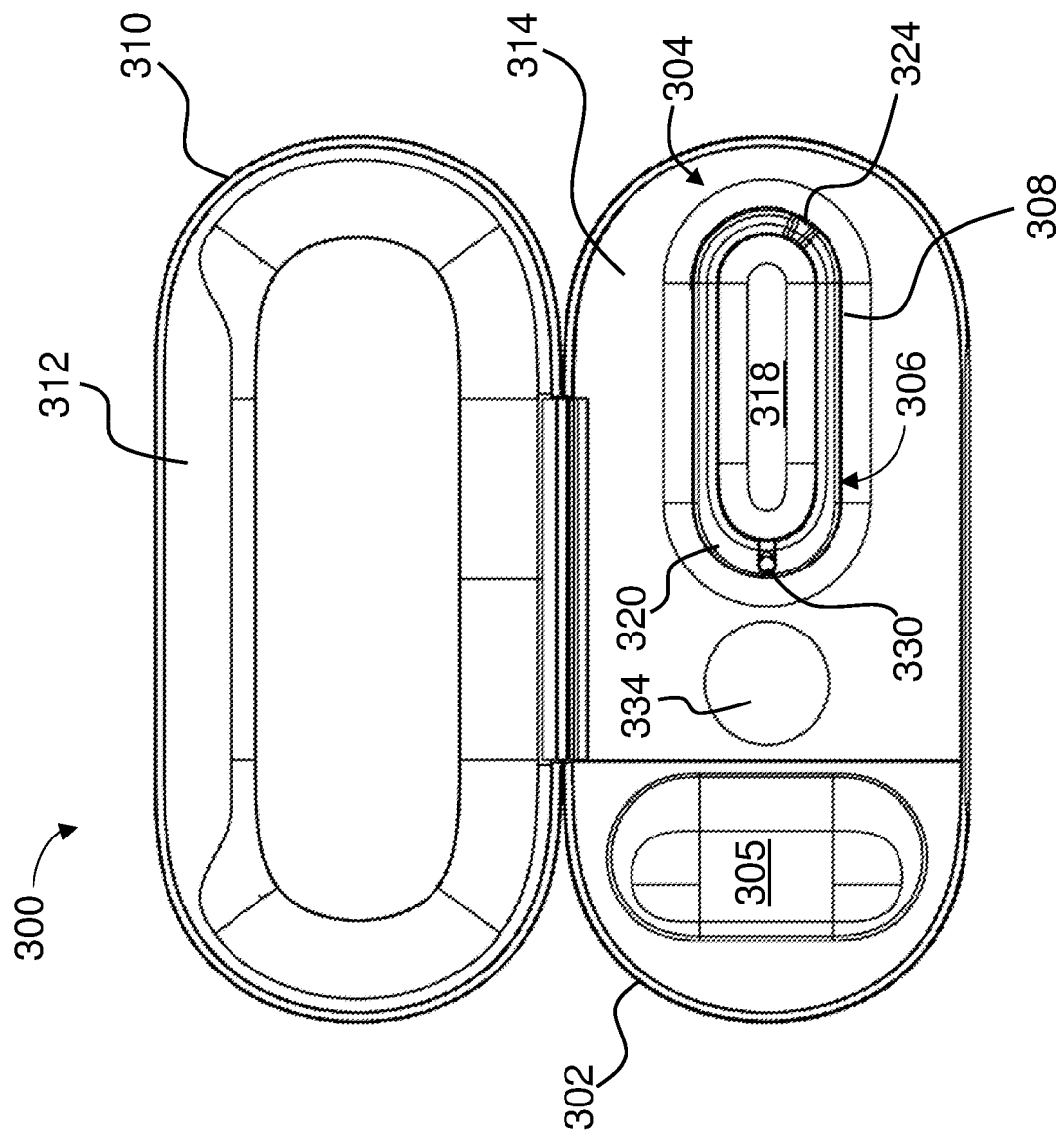
FIG. 3C is a top view of the case of FIG. 1A, shown with the case in the open position.
Figure 3D:
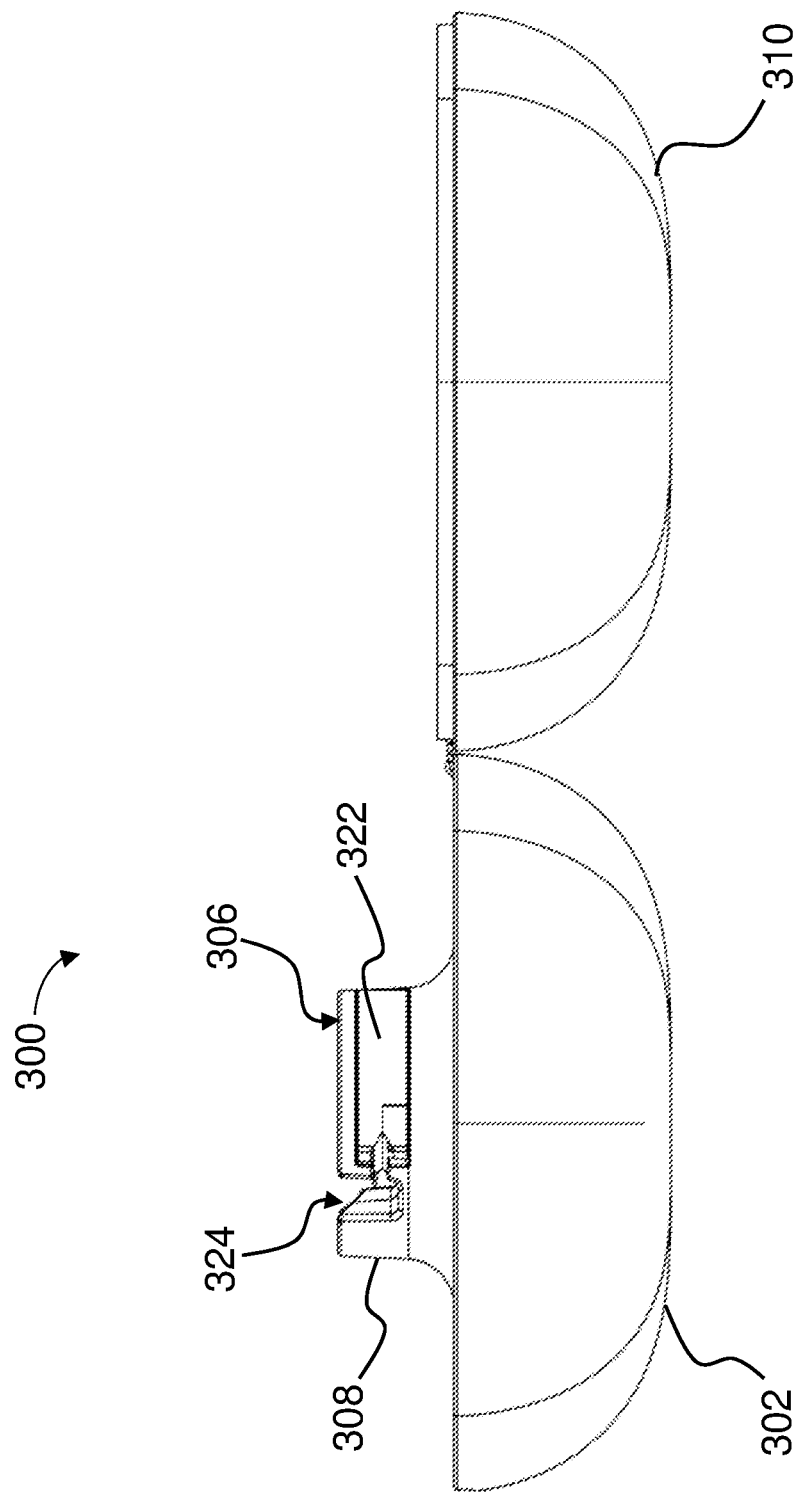
FIG. 3D is a rear view of the case of FIG. 1A, shown with the case in the open position.
Figure 3E:
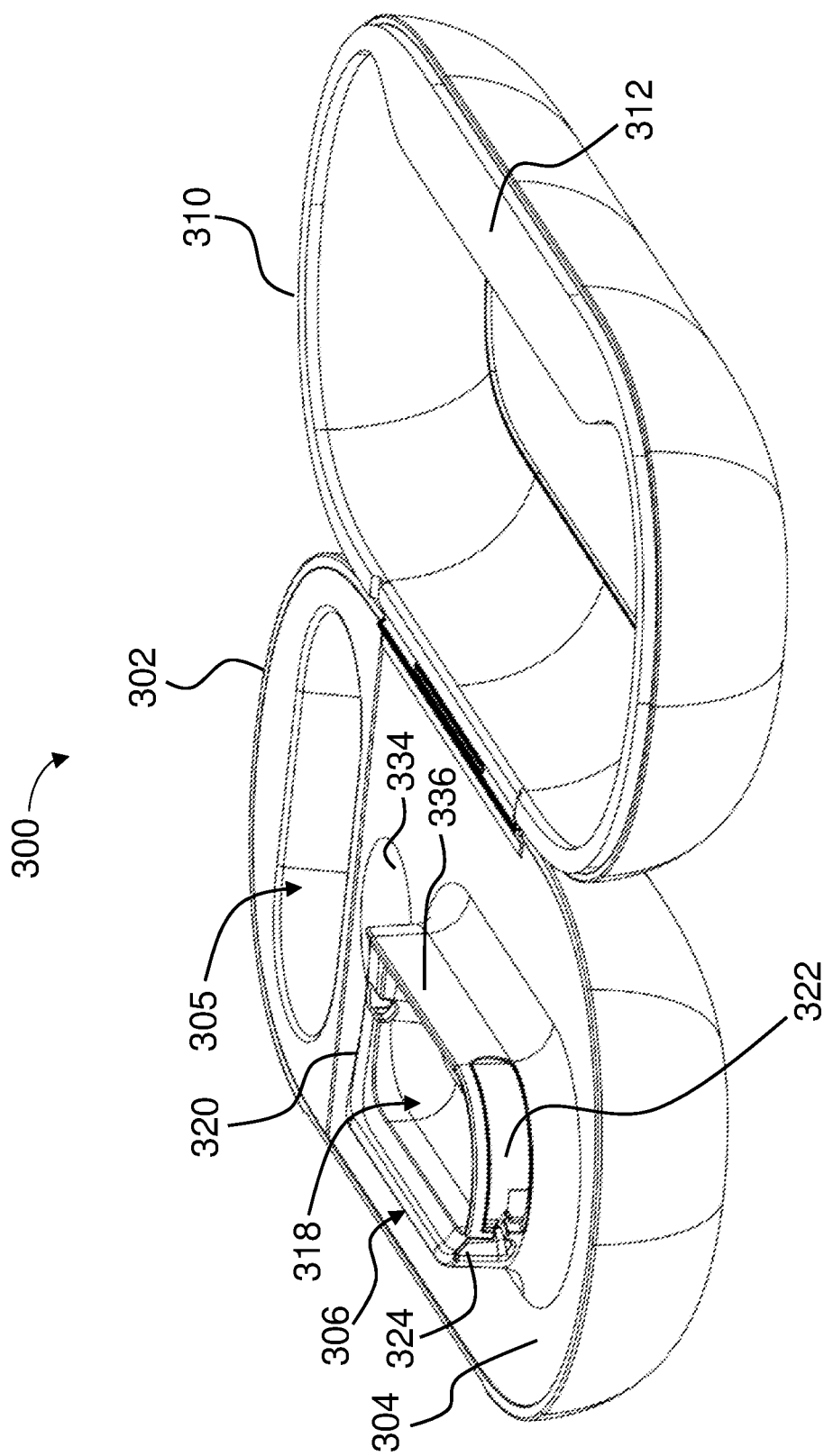
FIG. 3E is a rear perspective view of the case of FIG. 1A, shown with the case in the open position.
Figure 3F:
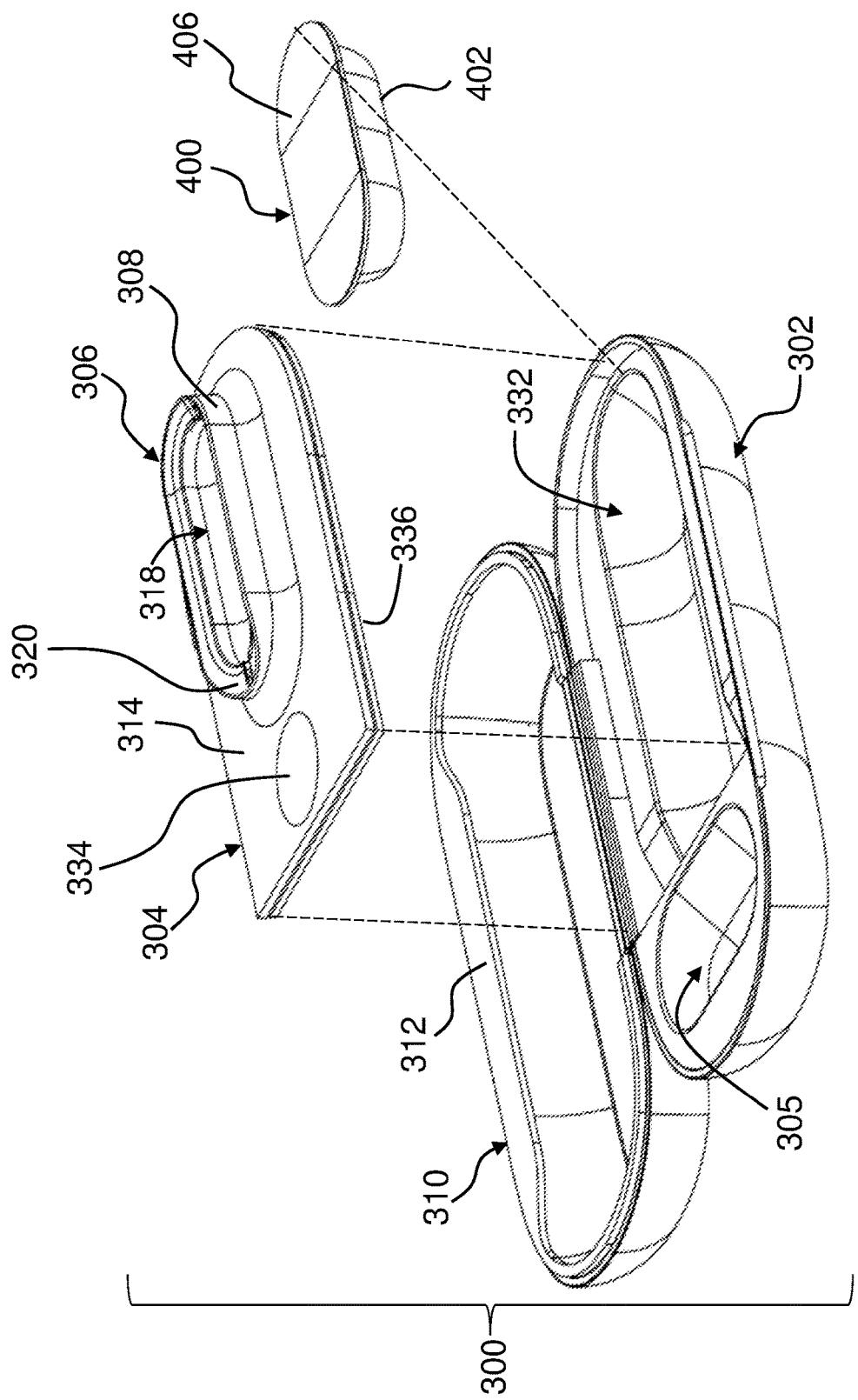
FIG. 3F is an exploded perspective view of the case of FIG. 1A, shown with the case in the open position and shown with a cartridge of dental floss material.
Figure 3G:
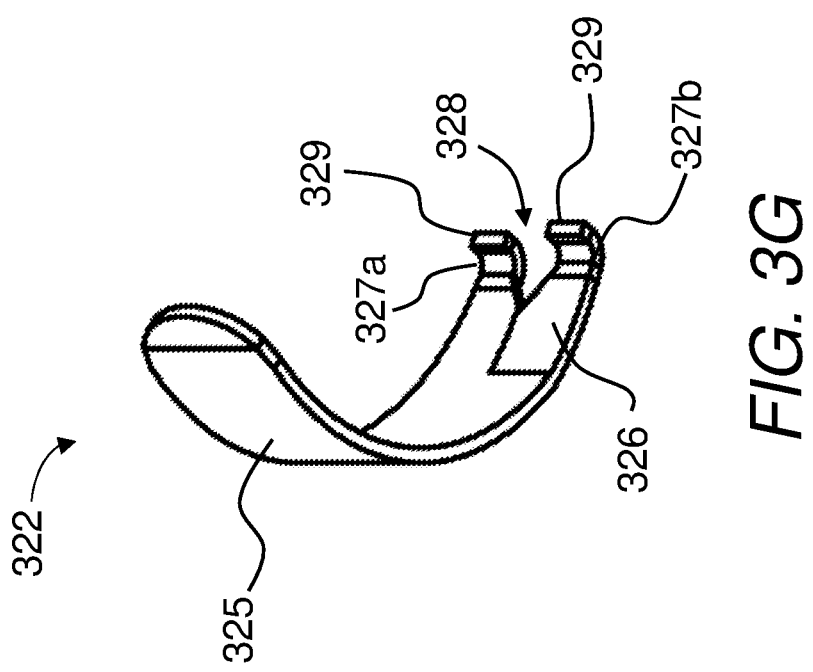
FIG. 3G is a perspective view of a cutting element of the case of FIG. 1A.
Figure 4B:
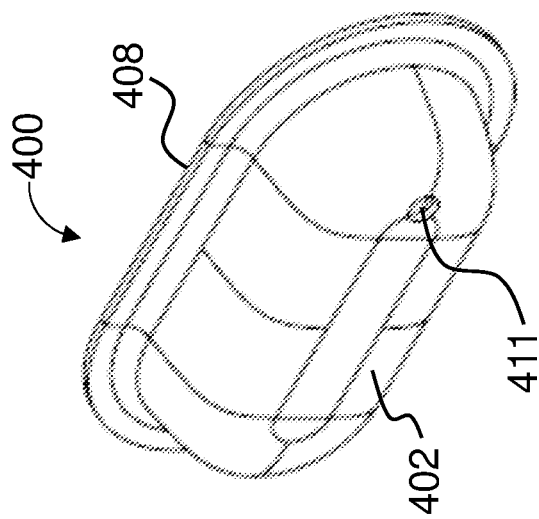
FIG. 4B is a bottom perspective view of the cartridge of FIG. 3F.
Figure 4A:
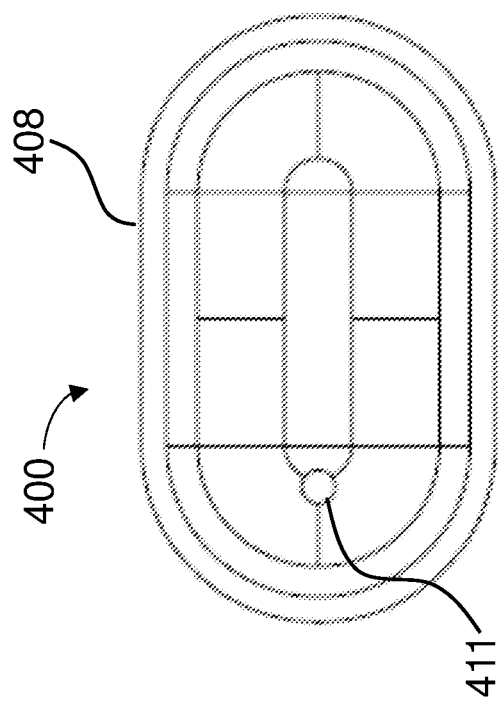
FIG. 4A is a bottom view of the cartridge of FIG. 3F.
Figure 4D:
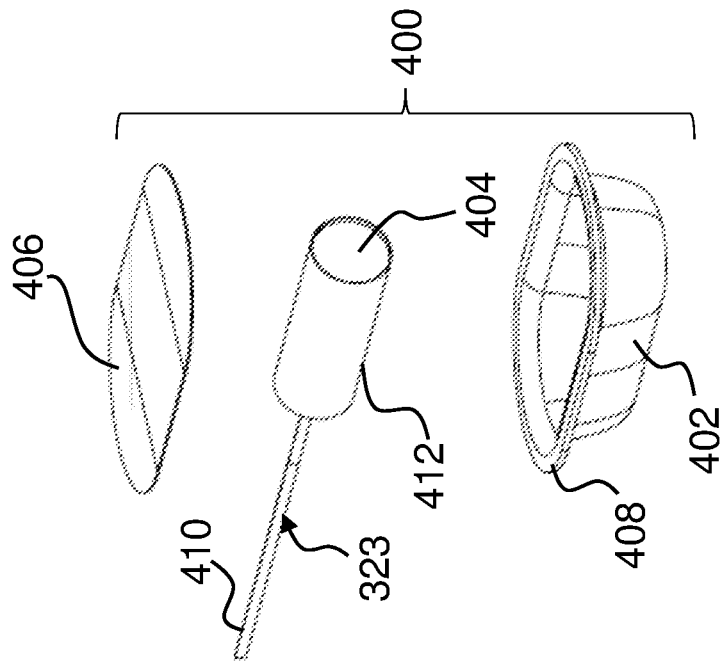
FIG. 4D is a perspective view of the exploded representation of the cartridge shown in FIG. 4C, with the covering shown disposed about the bobbin of dental floss material.
Figure 4C:
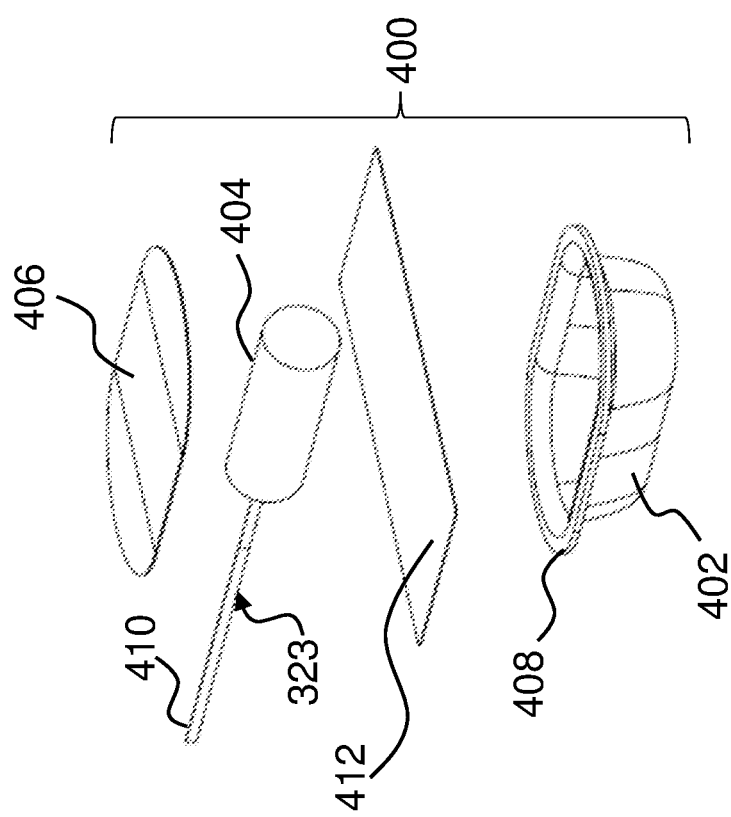
FIG. 4C is a perspective view of the cartridge shown with a lid, a bobbin of dental floss material, a container, and a covering shown exploded relative to one another.

Referring now to FIGS. 1A-1C, a dental hygiene system 100 may include a dental flossing pick 200 and a case 300. As described in greater detail below, the dental flossing pick 200 may be actuatable between an open state and a closed state to facilitate selectively grasping and releasing a length of dental floss material. In the closed state, the dental flossing pick 200 may include a handle 202 and a fork 204 coupled to one another, and a length of dental floss material may be held in tension between a first prong 206 and a second prong 208 of the fork 204. Further, or instead, the case 300 may store the dental flossing pick 200 with the dental flossing pick 200 in the closed state. For example, the case 300 may include a base 302, a panel 304, and a dispenser 306. The base 302 may define a cavity 305 in which the fork 204 of the dental flossing pick 200 may be positioned while the handle 202 of the dental flossing pick 200 is supported on a wall 308 of the dispenser 306 supported on the panel 304. With the dental flossing pick 200 so positioned along the base 302, the case 300 may provide sanitary storage for the dental flossing pick 200 and additionally, or alternatively, may facilitate transporting the dental flossing pick 200. As an example, the case 300 may include a cover 310 securable to the base 302 to envelope the dental flossing pick 200 within the case 300.

In use, as also described in greater detail below, the dental flossing pick 200 may be removed from the case 300, and a user may actuate the dental flossing pick 200 from an open state to a closed state to clamp an unused length of dental floss material such that the dental flossing pick 200 may be reused many times, thus reducing waste compared to single-use picks preloaded with dental floss material. For example, the dental flossing pick 200 may be spring-loaded according to any one or more of various techniques, described in greater detail below, to facilitate operating the dental flossing pick 200 to grasp the dental floss material reliably and with significant force to hold the dental floss material taut as the dental floss material is passed through spaces in the user's teeth. As also described in greater detail below, the case 300 may be reloadable with dental floss material to facilitate making the dental floss material conveniently available to a user before each use of the dental flossing pick 200, such as may be particularly useful for portability during travel or daily carrying.

Referring now to FIG. 1A and FIGS. 2A-2J, the dental flossing pick 200 may include a body 210 and a lever 212. The body 210 may include a first arm 216 and a first jaw 218, and the lever 212 may include a second arm 220 and a second jaw 222. As described in greater detail below, the body 210 and the lever 212 may be rotatably coupled to one another along a rotational axis R skew to a longitudinal axis L defined by the first arm 216 of the body 210 such that the fork 204 may be disposed at an oblique angle relative to the handle 202 to facilitate achieving proper orientation and reach of the dental flossing pick 200 in a user's mouth. In general, the rotational axis R may be between the first arm 216 and the first jaw 218 and, similarly, between the second arm 220 and the second jaw 222.

In general, rotation of the first arm 216 and the second arm 220 relative to one another about the rotational axis R moves the first jaw 218 and the second jaw 222 between an open state and a closed state. As used herein, it shall be understood that the state of the dental flossing pick 200 refers to the position of the first jaw 218 of the body and the second jaw 222 of the lever 212 relative to one another. For example, unless otherwise specified or made clear from the context, reference to an "open state" shall be understood to refer to any one or more of various positions of the first jaw 218 of the body 210 spaced apart from the second jaw 222 of the lever 212 such that a dental floss material may be removed from and/or introduced into spacing between the first jaw 218 and the second jaw 222. As another example, unless otherwise specified or made clear from the context, reference to a "closed state" shall be understood to refer to a position in which the first jaw 218 of the body 210 and the second jaw 222 of the lever 212 are in contact with one another. Thus, a length of dental floss material may be positioned between the first jaw 218 and the second jaw 222 in the open state, and the first arm 216 of the body 210 and the second arm 220 of the lever 212 may be pressed toward one another such that the resulting rotational motion of the body 210 and the lever 212 clamps the length of dental floss material between the first jaw 218 and the second jaw 222.

In certain implementations, rotation of the first arm 216 and the second arm 220 relative to one another about the rotational axis may advantageously change a form factor of the dental flossing pick 200. For example, in the closed state, the body 210 and the lever 212 may collectively form the dental flossing pick 200 having a form factor including the handle 202 and the fork 204. More specifically, in the closed state, the first arm 216 of the body 210 and the second arm 220 of the lever 212 may collectively form the handle 202. Further, or instead, in the closed state, the first jaw 218 of the body and the second jaw 222 of the lever 212 may collectively form the first prong 206 and the second prong 208 of the fork 204 such that a length of dental floss material clamped between the first jaw 218 and the second jaw 222 may be held taut along a gap 224 defined by the first prong 206 and the second prong 208. Stated differently, rotation of the body 210 and the lever 212 relative to one another from the open state to the closed state produces a clamping force on a length of dental floss material while advantageously also forming the dental flossing pick 200 into a form factor— one with the fork 204 coupled and distal to the handle 202—usable for flossing. For example, by partially inserting the dental flossing pick 200 into the user's mouth with one of the first prong 206 or the second prong 208 on the facial side of the user's teeth and the other one of the first prong 206 or the second prong 208 on the lingual side of the user's teeth the length of dental floss material held taut along the gap 224 between the first prong 206 and the second prong 208 may be passed between two individual teeth of the user to carry out a dental flossing process. When flossing process is completed, the body 210 and the lever 212 may be rotated away from one another to move the first jaw 218 and the second jaw 222 from the closed state to the open state to allow the used length of dental floss material to be replaced for a subsequent flossing process.

In general, the body 210 and the lever 212 may be rotatable relative to one another about the rotational axis R via any one or more of various different hinge arrangements useful for providing reliable rotational movement in both directions, over multiple uses, and in the presence of moisture (e.g., saliva). For example, the body 210 may include one or more rods 228, and the lever 212 may define one or more receptacles 230. Each instance of the one or more rods 228 may be positioned in a respective instance of the one or more receptacles 230 to rotatably couple the body 210 to one another. That is each instance of the one or more rods 228 may be rotatable in the respective instance of the one or more receptacles 230 while being restricted with respect to other types of motion. As may be appreciated, in this example, the rotational axis R extends through the one or more rods 228. In some implementations, rotational motion of the body 210 and the lever 212 about the rotational axis R may be restricted by one or more features of the body 210 and the lever 212 interfering with one another to act as a stopper, restricting rotational motion to within a predetermined range useful for facilitating grasping a length of dental floss material.

In some instances, the dental flossing pick 200 may include at least one torsion spring 226 coupled to the body 210 and the lever 212. The at least one torsion spring 226 may, for example, resist rotation of the of the body 210 and the lever 212 relative to one another about the rotational axis R. That is, the first arm 216 of the body 210 and the second arm 220 of the lever 212 may be rotatable toward one another, against a resistance force of the at least one torsion spring 226, from an open state to a closed state to form the handle 202. Stated differently, the at least one torsion spring 226 may bias the first jaw 218 and the second jaw 222 away from one another, such as may be useful for reducing the likelihood of unintended pinching and, further or instead, to reduce the amount of fine motor hand movements required to clamp a length of dental floss material between the first jaw 218 and the second jaw 222. Further, or instead, the rotational spring bias provided by the at least one torsion spring 226 may facilitate separating the first arm 216 of the body 210 and the second arm 220 of the lever 212 from one another in a forceful manner when the first arm 216 and the second arm 220 are locked together according to any one or more of the various locking techniques described herein. Such forceful separation may be useful for, among other things, facilitating separation of the first arm 216 and the second arm 220 from one another when these are wet with saliva.

As an example, the at least one torsion spring 226 may be positioned about the rotational axis R in an orientation resisting rotation of the body 210 and the lever 212 about the rotational axis R to move the first jaw 218 and the second jaw 222 from the open position to the closed position. Thus, returning to the example of the body 210 and the lever 212 rotationally coupled to one another through the one or more rods 228 rotatable in the one or more receptacles 230, each instance of the at least one torsion spring 226 may be disposed about an instance of the one or more rods 228 and in contact with the body 210 and the lever 212.

In general, the handle 202 collectively formed by the body 210 and the lever 212 in the closed state may have any one or more of various different form factors useful for facilitating grasping by a user. For example, the handle 202 may have a form factor that may be grasped between a thumb and a forefinger of a user. Further, to facilitate moving the dental flossing pick 200 through a variety of positions useful for accommodating variations in teeth spacing, the form factor of the handle 202 may facilitate grasping in any one or more of various different orientations of the handle 202.

In some instances, the body 210 and the lever 212 may be flush with one another in the closed state to present the user with a form factor of the handle 202 that is substantially uniform along the longitudinal axis L, such as may be useful for facilitating grasping the handle 202 at any one or more of various different longitudinal positions. As an example, the first arm 216 of the body 210 may define a recess 232, and the lever 212 may be at least partially positionable in the recess 232 in the closed state in which the first arm 216 of the body 210 and the second arm 220 of the lever 212 form the handle 202. That is, the recess 232 may be useful for decoupling aspects of the shape of the second arm 220 of the lever from the overall shape and size of the handle 202 formed when the second arm 220 is at least partially disposed in the recess 232. In some implementations, the recess 232 may have a depth corresponding to a height of the second arm 220 such that the handle 202 may have a substantially continuous surface when the second arm 220 is positioned in the recess 232. In this context, a substantially continuous surface shall be understood to allow for a seam between the first arm 216 and the second arm 220 when the second arm 220 is positioned in the recess 232.

While the first arm 216 of the body 210 and the second arm 220 of the lever may have any one or more of various different relative lengths, the first arm 216 of the body 210 may advantageously extend proximal to the second arm 220 of the lever 212 when the body 210 and the lever 212 collectively form the handle 202 in some instances. For example, the first arm 216 of the body 210 extending proximal to the second arm 220 of the lever 212 may facilitate supporting the first arm 216 with a thumb while a forefinger of the same hand of the pinches the second arm 220 of the lever 212 toward the first arm 216 to form the handle 202. Additionally, or alternatively, the first arm 216 of the body 210 extending proximal to the second arm 220 of the lever 212 may lock the second arm 220 to the first arm 216 to reduce the likelihood of inadvertently separating the handle 202 during use of the dental flossing pick 200 during a flossing procedure. That is, in instances in which the at least one torsion spring 226 biases rotation of the first arm 216 and the second arm 220 away from one another, releasable securement of the second arm 220 of the lever 212 in the recess 232 of the body 210 resists rotation of the lever 212 and the body 210 relative to one another under the force of the at least one torsion spring 226. By way of example and not limitation, a locking mechanism for securing the first arm 216 and the second arm 220 to one another to form the handle 202 may include at least one of the following: a latch, a hook, a key-and-lock arrangement, a spring, a temporary adhesive mechanism, or a hook-and-loop fastener.

As a specific example, the dental flossing pick 200 may include a locking mechanism 234 carried along the body 210. The locking mechanism 234 may include a linear spring 236 and a pin 238. The linear spring 236 and the pin 238 may be supported, for example, along the first arm 216 of the body 210, with the linear spring 236 biasing the pin 238 into the recess 232 defined by the first arm 216. Additionally, or alternatively, the second arm 220 may define at least one notch 240 releasably engageable with the pin 238 in the recess 232. That is, as the second arm 220 of the lever 212 is positioned in the recess 232, the linear spring 236 may bias the pin 238 into the recess 232, where the at least one notch 240 of the second arm 220 of the lever 212 may engage the pin 238 to hold the lever 212 in place in the recess 232 until the locking mechanism 234 is actuated to release such engagement between the pin 238 and the at least one notch 240.

The locking mechanism 234 may further, or instead, include a tray 242. The linear spring 236 may be positioned within the tray 242. One end of the linear spring 236 may push against the pin 238 and another end of the linear spring 236 may push against and/or be secured to a rear edge 245 (or any other stopper) of the tray 242. In certain instances, the tray 1202 may be secured within the first arm 216 using a cover 244. The cover 244 may include one or more rails 246 that may stabilize the tray 242 against inadvertent movement within the first arm 216.

While the locking mechanism 234 may be unlockable by pulling one or both of the first arm 216 or the second arm 220 away from one another, the locking mechanism 234 may include an actuator to facilitate releasing the first arm 216 from the second arm 220 in some instances. For example, the first arm 216 of the body 210 may include an actuator 248 (e.g., a button or a flexible region of material). The actuator 248 may be in mechanical communication with the pin 238 such that the actuator 248 is depressible or otherwise moveable to retract the pin 238 out of engagement with the at least one notch 240 of the second arm 220. For example, the actuator 248 may be in mechanical communication with the pin 238 via the tray 242, and depressing the actuator 248 may move the tray 242—and, thus, the linear spring 236 and the pin 238—such that the pin 238 moves out of the recess 232 to disengage the one or more notches of the 240 of the second arm 220. With the pin 238 disengaged from the at least one notch 240 of the second arm 220 of the lever 212, the first arm 216 and the second arm 220 may be rotated away from one another. For example, in instances in which the at least one torsion spring 226 biases the first arm 216 and the second arm 220 to rotate away from one another, releasing the locking mechanism 234 may release resistance to rotational movement between the lever 212 and the body 210 such that the first arm 216 and the second arm 220 move from the closed state to the open state in which the first jaw 218 and the second jaw 222 are unclamped from one another. In certain instances, releasing the locking mechanism 234 may result in a rapid change of force on the second arm 220, causing the second arm 220 to move rapidly away from the recess 232 of the first arm 216 under the force of the at least one torsion spring 226. Such rapid movement of the second arm 220 away from the first arm 216 may be described as the second arm 220 "popping" open from the recess 232.

The actuator 248 may generally be positioned along any portion of the first arm 216 as may facilitate reliable actuation by a user. Thus, for example, the actuator 248 may be along a portion of the first arm 216 proximal to the second arm 220 such that the lever 212 is rotatable away from the actuator 248 in response to actuation (e.g., depression of a button or a flexible section) of the actuator 248. It shall be appreciated that such positioning of the actuator may, among other things, reduce the likelihood that the user's interaction with the actuator 248 will interfere with release of the second arm 220 of the lever 212 away from the recess 232 of the first arm 216.

While the locking mechanism 234 has been described as having certain features on the body 210 and other features on the lever 212, it shall be appreciated that the positioning of components may be reversed unless otherwise specified or made clear from the context.

In general, the first jaw 218 and the second jaw 222 may have any one or more of various different shapes as may be useful for engagement with one another to clamp a length of dental floss material therebetween. For the sake of clear and efficient explanation, the term "jaw" and variations thereof used herein shall be understood to refer to a half of a clamp producing a clamping force in the closed state of the dental flossing pick 200. Thus, in particular, the first jaw 218 shall be understood to include two sections (one along the first prong 206 and one along the second prong 208) that are substantially identical, with allowances for manufacturing tolerances. Similarly, the second jaw 222 shall be understood to include two sections (one along the first prong 206 and one along the second prong 208), again with allowances for manufacturing tolerances.

In some implementations, the first prong 206 and the second prong 208 formed by the first jaw 218 and the second jaw 222 in the closed state may be spaced a predetermined distance A apart. The predetermined distance A may be based on a size that may be comfortably inserted into the mouth of a user and subsequent ease of flossing by the user. For example, the predetermined distance A may be determined based on an average size of user's mouth (e.g., when the user's mouth is open). The predetermined distance A (as well as other size parameters of the dental flossing pick 200) may vary to accommodate different users (e.g., size parameters may be smaller for children as compared to adult users). In some instances, the predetermined distance A between the first prong 206 and the second prong 208 may be adjustable to allow the user to increase and/or reduce the predetermined distance A.

In general, with the dental flossing pick 200 in the closed state, the first prong 206 and the second prong 208 may be disposed at an angle $\alpha$ with respect to the handle 202. The angular positioning of the first prong 206 and the second prong 208 may assist with ease of use and/or comfortable insertion of the dental flossing pick 200 into the mouth of the user and flossing by the user. The angle $\alpha$ may be any predetermined angle and may be similarly determined based on an average size of user's mouth. As shall be understood, the angle $\alpha$ may vary to accommodate different users (e.g., the angle $\alpha$ may be smaller for child as compared to adult users). In some implementations, the angle $\alpha$ may additionally, or alternatively, also be adjustable. For example, the user may wish to increase (e.g., make the angle $\alpha$ more obtuse) or decrease the angle (e.g., make it closer to a right angle or an acute angle).

One or both of the first jaw 218 or the second jaw 222 may include traction features 250 useful for gripping a length of dental floss material when the first jaw 218 and the second jaw 222 are clamped together in the closed state. For example, the first jaw 218 and the second jaw 222 include respective instances of the traction features 250 interlocking one another with the first jaw 218 and the second jaw 222 clamped to one another in the closed state. The traction features 250 may include, for example, include one or more teeth engageable with one another when the first jaw 218 and the second jaw 222 are in the closed state. Additionally, or alternatively, the traction features 250 may include temporary adhesives useful for holding a length of dental floss clamped between the first jaw 218 and the second jaw 222. Still further or instead, the traction features 250 may include one or more hooks securable to the length of dental floss material held between the first jaw 218 and the second jaw 222.

Having described various features of the dental flossing pick 200, attention is now directed to the case 300 in which the dental flossing pick 200 may be stored between uses and from which dental floss material may be dispensed in an orientation facilitating clamping by the dental flossing pick 200.

Referring now to FIG. 1A and FIGS. 3A-3G, the case 300 may generally include the base 302, the panel 304, and the dispenser 306. As described in greater detail below, the dispenser 306 may include a wall 308 supported on a first surface of the panel 304 to facilitate supporting the dental flossing pick 200 in a stable orientation while also presenting dental floss in an orientation that facilitates being clamped in the fork 204 of the dental flossing pick 200. In certain implementations, the case 300 may include the cover 310 securable to the base 302 to envelop the dental flossing pick 200. For example, the cover 310 may be hingedly coupled to the base 302 to reduce the likelihood of misplacement of the cover between uses. Additionally, or alternatively, the cover 310 may be securable to the base 302 via a lock 312 (e.g., one or more magnetic sections attractable to one another to hold the cover 310 and the base 302 together), as may be useful for reducing the likelihood that the dental flossing pick 200 may become inadvertently dislodged from the case 300 or otherwise exposed to potentially unsanitary conditions.

In general, the wall 308 of the dispenser 306 may extend away from the first surface 314 of the panel 304, and the cavity 305 defined by the base 302 may extend in a direction opposite the direction of extension of the wall 308 away from the first surface 314. That is, the cavity 305 may be spaced away from the wall 308 and may extend below the first surface 314 to facilitate accommodating the angle between the fork 204 and the handle 202 without deforming or otherwise damaging the dental flossing pick 200 supported on the base 302. More specifically, with the handle 202 of the dental flossing pick 200 supported on the wall 308 of the dispenser 306, the fork 204 of the dental flossing pick 200 may be disposed in the cavity 305 defined by the base 302.

In certain implementations, the wall 308 of the dispenser 306 may define a dispensing volume 318. As described in greater detail below, a length of dental floss material may be stretched across the dispensing volume 318, and the dental flossing pick 200 may be at least partially extended into the dispensing volume 318 to grasp the length of dental floss material from the dispensing volume 318. Importantly, the handle 202 may be shaped to cover the dispensing volume 318 when the handle 202 of the dental flossing pick 200 is supported on the wall 308 of the dispenser 306 between uses. That is, the handle 202 of the dental flossing pick 200 may act as a lid that reduces the likelihood that a length of dental floss material stretched across the dispensing volume 318 will become contaminated between uses of the dental flossing pick 200. In certain instances, a portion of the wall 308 closest to the cavity 305 may include a lip 320 having a shape conforming to a contour of a portion of the handle 202 of the dental flossing pick 200 supportable on the wall 308 of the dispenser 306. It shall be appreciated that the lip 320 conforming to the contour of the handle 202 may facilitate supporting the handle 202 in a stable orientation over the dispensing volume 318 and further, or instead, may reduce the likelihood of ingress of debris into the dispensing volume 318.

In certain instances, the dispenser 306 may include a cutting element 322 disposed proximate to the dispensing volume 318 such that the cutting element 322 may cut a length of dental floss material extended across the dispensing volume 318. For example, the wall 308 of the dispenser 306 may define a slit 324, and the cutting element 322 may be supported on the wall 308 adjacent to the slit 324. In use, once a dental floss a length of the dental floss material may be moved into contact with the cutting element 322 via the slit 324 such that the dental floss material may be cut once the length of the dental floss material is grasped in the fork 204 of the dental flossing pick 200. The slit 324 may be useful for aligning the dental floss material with the cutting element 322. Further or instead, the slit 324 may provide protection against inadvertent contact between a user and the cutting element 322.

The cutting element 322 may include, for example, a curved strip 325 that may be coupled (e.g., glued, welded, etc.) and/or integrated with the wall 308 of the dispenser 306. The curvature of the curved strip 325 may correspond to curvature of the wall 308. The curved strip 325 may include a cutting structure 326 that may be positioned adjacent to the slit 324. The cutting structure 326 may include cutting prongs 327a,b forming a triangular opening 328. The cutting prongs 327a,b may be sharpened and serve as blades for cutting the dental floss material. The cutting prongs 327a,b may further, or instead, include curved ends 329 useful for securing the curved strip 1302 to the wall 1301 at one of the sides of the slit 324. The curved strip 325 may include any metal, composite materials, plastic, etc. While the cutting element 322 has been described as including the cutting prongs 327a,b, it shall be appreciated that the cutting element 322 may include any one or more of various different cutting mechanisms. For example, cutting element 322 may include one or more blades, scissors, cutters, etc.

In certain instances, the wall 308 of the dispenser 306 may define at least a portion of an orifice 330 through which a supply of dental floss material may be moved, as described in greater detail below. For example, a dental floss material 323 may be stretched across the dispensing volume 318 along a linear distance from the orifice 330 and the cutting element 322. This linear distance may be greater than a distance between the first prong 206 and the second prong 208 of the of the fork 204 of the dental flossing pick 200, as may be useful for manipulating the dental flossing pick 200 within the dispensing volume 318 to grasp a length of dental floss material. Once the length of a dental floss material 323 is clamped by the dental flossing pick 200, the user may pull the dental flossing pick 200, in the clamped state, away from the dispenser 306. Pulling of the dental floss pick 200 may cause threading of a new length of the dental floss material 323 from the orifice 330. The user may then use the cutting element 322 to cut the fresh string of the dental floss material 323 clamped by the dental flossing pick 200 to free the dental flossing pick 200 from being attached to the dental floss material 323 to the case 300. This procedure may be repeated each time the user desires to change the string of the dental floss material 323 clamped by the dental flossing pick 200. Once the user has completed flossing, the dental flossing pick 200 may be stored on the base 302 as described herein.

In general, the base 302 may define a compartment 332, and the panel 304 may be releasably securable to the base 302 over the compartment 332 such that removal of the panel 304 may provide selective access to the compartment 332. For example, the panel 304 may include a button section 334 along the first surface 314, such as along a portion of the first surface 314 between the cavity 305 and the dispenser 306. Continuing with this example, the button section 334 may be depressible to release the panel 304 from the base 302 to expose the compartment 332. The button section 334 may include a button with a distance of travel in some instances. Further or instead, the button section 334 may include a section of the panel 304 that may be pressed to move the panel 304 downward into the compartment 332 such that another portion of the panel 304 gets tilted upward way from the compartment 332. Additionally, or alternatively, the panel 304 may be releasably secured to the base 302 over the compartment 332 using any one or more of a latch, a hook, a switch, a ball, a snap-fit, and/or any other type of mechanism and/or any combination thereof.

A supply of the dental floss material 323 may be generally stored in the compartment 332 and gradually pulled from the compartment 332 through multiple uses of the dental flossing pick 200. For example, the panel 304 may have a second surface 336 opposite the first surface 314, and the panel 304 may be releasably securable over the compartment 332 with the second surface 336 facing the compartment 332. Further, or instead, the panel 304 and the wall 308 may collectively define the orifice 330 such that the orifice 330 extends from the second surface of the panel 304 to the dispensing volume 318. That is, with the panel 304 releasably secured over the compartment 332 such that the second surface 336 of the panel 304 faces the compartment 332, a supply of the dental floss material 323 may be threaded from the compartment 332 to the dispensing volume 318 via the orifice 330.

In certain implementations, the supply of the dental floss material 323 may include a cartridge 400 positionable in the compartment 332 in a predetermined orientation. For example, the cartridge 400 may be securable to the second surface 336 of the panel 304 and/or to one or more walls of the base 302 along the compartment 332. Alternatively, or additionally, the cartridge 400 may be supported in the compartment 332 with a friction fit between the cartridge and the compartment 332. More generally, the cartridge 400 may be securable in the compartment 332 such that there is little or no movement of the cartridge 400 in the compartment.

Having described various aspects of dispensing the dental floss material 323 from the case 300, attention is now directed to various aspects of the cartridge 400 that may be used as a replaceable supply of the dental floss material 323 that may be dispensed from the case 300 for use with the dental flossing pick 200.

Referring now to FIGS. 4A-4D, the cartridge 400 may include a container 402, a bobbin 404 of the dental floss material 323, and a lid 406. The container 402 may include a rim 408, and the lid 406 may be disposed on the rim 408 of the container 402 such that the container 402 and the lid 406 collectively envelop the bobbin 404 of the dental floss material 323. In certain implementations, the container 402 may define a hole 411 away from the lid 406, and an end 410 of the bobbin 404 of the dental floss material 323 may extend through the hole 411. It shall be appreciated that the end 410 of the bobbin 404 may be pulled to dispense additional amounts of dental floss material from the cartridge 400.

The bobbin 404 may be wound in a cylindrical shape, as may be useful for retaining a physical structure to reduce the likelihood of entanglement of the dental floss material as the dental floss material is unwound from the bobbin 404. Additionally, or alternatively, the cartridge 400 may include a covering 412 adhered to the bobbin 404 and extending circumferentially about the bobbin 404. The covering 412 may to support physical structure of the bobbin 404 to assist during unwinding of the floss, thus reducing the likelihood of accidental unwinding of the floss and/or the floss becoming loose, tangled, etc. In some exemplary implementations, the covering 412 may be made from any thin film, molded paper pulp, plastic cover, and/or any other desired material. The covering 412 may be a soft shell and/or a hard shell. Further, or instead, the bobbin 404 may be wound as a coreless cylinder (e.g., without any paper, plastic, wood, etc. core in the center of the bobbin), as may be useful for unwinding of the dental floss material from the bobbin 404 by pulling the dental floss material from an interior portion of the bobbin 404 rather than from an exterior portion of the bobbin 404.

Further, while the bobbin 404 has been described as being wound in a cylindrical shape, it shall be appreciated that the bobbin 404 may be wound in any one or more of various different shapes, as may be useful for retaining a physical structure of the bobbin 404 to reduce the likelihood of entanglement of the dental floss material as the dental floss material is unwound from the bobbin 404. For example, the bobbin 404 may be wound having an olive shape, a cocoon shape, and/or as a flat oval spool with its winding axis as its minor dimension rather than its major dimension (e.g., the bobbin 404 may be wider than it is tall).

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A dental hygiene system comprising:
   a dental flossing pick including a handle and a fork coupled to one another, the fork including a first prong and a second prong, and the fork actuatable to clamp a length of dental floss material in tension in a gap defined by the first prong and the second prong; and
   a case including a base, a panel, a dispenser, and a cover,
      the panel covering a compartment for storing a container of dental floss material, wherein the panel is releasably securable to the base,
      the panel having a first surface supporting the dispenser,
      the dispenser including a wall extending away from the first surface,
      the base defining a cavity extending in a direction opposite the wall of the dispenser,
      the cover hingedly coupled to the base,
      the dental flossing pick storable along the base with the fork in the cavity and the handle supported on the wall of the dispenser; and
      the dispenser further includes a dispensing volume and an orifice, wherein the dental floss material contained in the compartment is threaded through the orifice and extended across the dispensing volume from the orifice to a cutting element supported on the wall.

2. The dental hygiene system of claim 1, wherein the wall of the dispenser defines a dispensing volume, and the handle of the dental flossing pick is supportable on the wall of the dispenser to cover the dispensing volume.

3. The dental hygiene system of claim 2, wherein the wall defines a slit, and the cutting element is supported on the wall adjacent to the slit.

4. The dental hygiene system of claim 3, wherein the base defines the compartment, and the panel is releasably securable to the base over the compartment, wherein removal of the panel exposes the container of dental floss material.

5. The dental hygiene system of claim 1, wherein the cover is configured to hingedly open in a direction away from the panel and hingedly close in a direction toward the panel.

6. The dental hygiene system of claim 1, wherein the dispenser further comprises a dispensing volume with a linear distance greater than a distance between the first prong and the second prong of the fork of the dental flossing pick for manipulating the dental flossing pick within the dispensing volume to grasp a length of dental floss material that extends across the dispensing volume along the linear distance.

7. The dental hygiene system of claim 6, wherein the dispenser further comprises a wall and a cavity, wherein a portion of the wall includes a lip for supporting the handle over the dispensing volume for preventing ingress of debris into the dispensing volume.

* * * * *